United States Patent
Mennicken et al.

(10) Patent No.: US 11,886,486 B2
(45) Date of Patent: Jan. 30, 2024

(54) APPARATUS, SYSTEMS AND METHODS FOR PROVIDING SEGUES TO CONTEXTUALIZE MEDIA CONTENT

(71) Applicant: Spotify AB, Stockholm (SE)

(72) Inventors: Sarah Mennicken, San Francisco, CA (US); Morteza Behrooz, Santa Cruz, CA (US); Henriette Cramer, San Francisco, CA (US); Rohit Kumar, Stockholm (SE)

(73) Assignee: Spotify AB, Stockholm (SE)

( * ) Notice: Subject to any disclaimer, the term of this patent is extended or adjusted under 35 U.S.C. 154(b) by 364 days.

(21) Appl. No.: 16/552,287

(22) Filed: Aug. 27, 2019

(65) Prior Publication Data

US 2020/0159761 A1 May 21, 2020

Related U.S. Application Data

(60) Provisional application No. 62/724,831, filed on Aug. 30, 2018.

(51) Int. Cl.
| | |
|---|---|
| G06F 16/43 | (2019.01) |
| G06F 16/22 | (2019.01) |
| G06F 16/41 | (2019.01) |
| G06F 16/24 | (2019.01) |
| G06F 16/48 | (2019.01) |
| G06F 16/438 | (2019.01) |
| G06F 40/56 | (2020.01) |

(52) U.S. Cl.
CPC .......... *G06F 16/4387* (2019.01); *G06F 16/22* (2019.01); *G06F 16/24* (2019.01); *G06F 16/41* (2019.01); *G06F 16/43* (2019.01); *G06F 16/48* (2019.01); *G06F 40/56* (2020.01)

(58) Field of Classification Search
None
See application file for complete search history.

(56) References Cited

U.S. PATENT DOCUMENTS

| | | | |
|---|---|---|---|
| 7,246,315 B1 * | 7/2007 | Andrieu | G06Q 90/00 715/706 |
| 9,459,828 B2 | 10/2016 | Ales | |
| 10,353,942 B2 | 7/2019 | Imbruce et al. | |
| 10,939,187 B1 * | 3/2021 | Goyal | H04N 21/47202 |

(Continued)

FOREIGN PATENT DOCUMENTS

WO 2014/160290 A1 10/2014

OTHER PUBLICATIONS

R. Ragno; Inferring Similarity Between Music Objects with Application to Playlist Generation; ACM; 2005; pp. 73-80 (Year: 2005).*

(Continued)

*Primary Examiner* — Albert M Phillips, III
*Assistant Examiner* — Jermaine A Mincey
(74) *Attorney, Agent, or Firm* — Merchant & Gould P.C.

(57) ABSTRACT

Apparatus, systems and methods for augmenting a group of media content items by forming a graph including a plurality of nodes and a plurality of edges, where each node represents a segue option at a position in the graph and each edge represents a connection between a first node in the graph at a first position and a second node in the graph at a second position and finding a path in the graph.

18 Claims, 17 Drawing Sheets

(56) References Cited

U.S. PATENT DOCUMENTS

| | | | | |
|---|---|---|---|---|
| 2013/0071031 | A1* | 3/2013 | Huang | G11B 27/034 |
| | | | | 382/190 |
| 2013/0117335 | A1 | 5/2013 | Jellison, Jr. et al. | |
| 2014/0122079 | A1 | 5/2014 | Kaszczuk et al. | |
| 2015/0079573 | A1* | 3/2015 | Haseltine | G09B 5/06 |
| | | | | 434/319 |
| 2016/0239876 | A1 | 8/2016 | Ales | |
| 2017/0243517 | A1* | 8/2017 | Midmore | G06F 3/017 |
| 2018/0336277 | A1* | 11/2018 | Alsina | G06F 16/9024 |

OTHER PUBLICATIONS

Geoffray Bonnin; Automated Generation of Music Playlists: Survey and Experiments; 2014; ACM; ACM Computing Surveys vol. 47 Issue 2 Article No. 26; pp. 1-35 (Year: 2014).*

H. Beyer and K. Holtzblatt, "Contextual Design: Defining Customer-Centered Systems", Morgan Kaufmann Publishers Inc., San Francisco, CA, United States, ISBN:978-0-08-050304-2 (Dec. 1997).

A. Ankolekar et al., "Evaluating Mobile Music Experiences: Radio On-the-Go", Int'l Conf. on Mobile Computing, Applications, and Services, Springer, Cham (2018).

D. Bainbridge et al., "How People Describe Their Music Information Needs: A Grounded Theory Analysis Of Music Queries" (2003).

Jody Berland "Radio space and industrial time: music formats, local narratives and technological mediation", Popular Music, vol. 9(2): 179-192 (1990).

W. Brewer and E. Lichtenstein, "Event Schemas, Story Schemas, and Story Grammars", Center for the Study of Reading Technical Report No. 197 (1980).

S. Brown et al., "Passive music listening spontaneously engages limbic and paralimbic systems." Neuroreport 15.13: 2033-2037 (2004).

R. Cardona-Rivera and B. Li, "PLOTSHOT: Generating discourse-constrained stories around photos." Twelfth Artificial Intelligence and Interactive Digital Entertainment Conference (2016).

A. Chaves and M. Gerosa, "Single or Multiple Conversational Agents? An Interactional Coherence Comparison", Proceedings of the 2018 CHI Conference on Human Factors in Computing Systems (2018).

J. Cox, "Spotify and Genius are collaborating on info-rich Behind the Lyrics playlists", The Verge (2016). Available at: https://www.theverge.com/2016/1/12/10750990/spotify-genius-behind-the-lyrics-playlists-iphone.

F. Diaz, "Mindfulness, attention, and flow during music listening: An empirical investigation", Psychology of Music 41(1) 42-58 (2011).

P. Gervas et al., "A Case Based Reasoning Approach to Story Plot Generation", European Conference on Case-Based Reasoning. Springer, Berlin, Heidelberg (2004).

C. Hosey et al. "Just give me what i want: How people use and evaluate music search." Proceedings of the 2019 CHI Conf. on Human Factors in Computing Systems, May 4-9, Glasgow, Scotland, UK (2019).

C. Hu, "From Mood Playlists to Metadata: How Smart Speakers Are the Next Frontier—And Challenge—For the Music Business", Billboard (2018).

J. Lee et al., "A Look at the Cloud from Both Sides Now: An Analysis of Cloud Music Service Usage", ISMIR, pp. 299-305 (2016).

J. Lee and R. Price, "Understanding Users of Commercial Music Services through Personas: Design Implications." ISMIR, pp. 476-482 (2015).

J. Lee et al., "Users' Music Information Needs and Behaviors: Design Implications for Music Information Retrieval Systems" Journal of the association for information science and technology 67.6:1301-1330 (2016).

A. Li, et al. "Search mindsets: Understanding focused and non-focused information seeking in music search." The World Wide Web Conference, pp. 2971-2977 (2019).

B. Li et al., "Story Generation with Crowdsourced Plot Graphs", Proceedings of the Twenty-Seventh AAAI Conf. on Artificial Intelligence, pp. 598-604 (2013).

A. Lonsdale and A. North, "Why do we listen to music? A uses and gratifications analysis", British Journal of Psychology, 102, pp. 108-134 (2011).

L. Martin et al., "Event Representations for Automated Story Generation with Deep Neural Nets", Thirty-Second AAAI Conf. on Artificial Intelligence, pp. 868-875 (2018).

"Everybody's Talkin': Smart Speakers & their impact on music consumption" Music Ally (2018). Available at: https://musically.com/wp-content/uploads/2018/03/SmartSpeakersFinal.pdf.

"The Smart Audio Report: Spring 2018 Release Coming Jul. 18", NPR and Edison Research. Accessed Sep. 8, 2019.

E. Nettamo et al., "A Cross-Cultural Study of Mobile Music—Retrieval, Management and Consumption" Proceedings of the 18th Australia conf. on Computer-Human Interaction: Design: Activities, Artefacts and Environments, Nov. 20-24, Sydney, Australia, pp. 87-94 (2006).

A. North and D. Hargreaves, "Situational influences on reported musical preference." Psychomusicology: A Journal of Research in Music Cognition 15.1-2: 30-45 (1996).

M. Riedl, "A Comparison of Interactive Narrative System Approaches Using Human Improvisational Actors", Proceedings of the intelligent narrative technologies III workshop (2010).

A. Sciuto et al., ""Hey Alexa, What's Up?": Studies of In-Home Conversational Agent Usage", Proceedings of the 2018 Designing Interactive Systems Conf., Jun. 9-13, Hong Kong (2018).

E. Stocks, "Music consumption in the era of smart speakers", Medium (2017). Available at: https://medium.com/@elliotjaystocks/music-consumption-in-the-era-of-smart-speakers-b88d04a18746.

R. Young et al., "Plans and Planning in Narrative Generation: A Review of Plan-Based Approaches to the Generation of Story, Discourse and Interactivity in Narratives", Sprache und Datenverarbeitung, Special Issue on Formal and Computational Models of Narrative, 37(1-2), pp. 39-62 (2013).

* cited by examiner

439
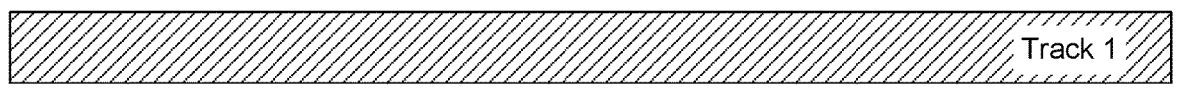
Track 1
Track 2
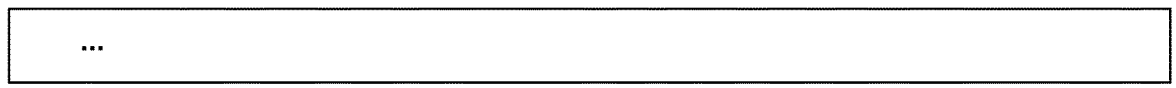
...
Track n - 1
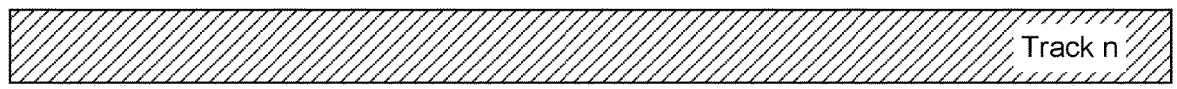
Track n
FIG. 5A

| Segue Type | Logic Description | NLG Template | Realized Text |
|---|---|---|---|
| NullSegue | Always a Match Regardless of the Songs. | N/A | N/A |
| MundaneSegue | Always a Match Regardless of the Songs. | Next Song is next_song_name by next_song_artist_name. | Next Song is Time by Pink Floyd. |
| ArtistOriginJump | Musical Origin of the Previous Song's Artist is Different than the Next One's. | From prev_city where prev_artist_name's Musical Origins are, to next_city where next_artist_name's are. | From Los Angeles where Tupac's Musical Origins are, to New York City, where Biggie's are. |
| SameYearSameArtist | Previous and Next Song Share the Same Artist and Release Year. | Just Like the Last Song, the Next Song is from next_song_release_year by next_song_artist_name. | Just Like the Last Song, the Next Song is from 2007 by Rihanna. |

FIG. 8

| Voice Prompt | User Response | Voice Response |
|---|---|---|
| From when do you Think this Last Song was? | Correct<br><br>Wrong | That's Right. But the Next Song, called Shook Ones, Pt. II takes us into a Different Era. All the Way to 1995. (DifferentEraSegue)<br>Actually, it's from 2007. The Next Song called Shook Ones, Pt. II and [...]. (DifferentEraSegue) |
| Question! Are you More Interested in the Artist's Background or the Genre? | Genre<br><br>Artist | The Genre of the Upcoming Song is called "Latin Trap". (NextGenreSegue) Next Song is by Cardi B. Here's a Fun Fact about their Biography... (ArtistQualFact) |

🎵 Juicy by The Notorious B.I.G.

Here's The Next Episode by Dr. Dre and Snoop Dogg.

🎵 The Next Episode by Dr. Dre

Now Switching from the 2001 (Explicit Version) Album to One called The Best of 2Pac - Pt. 1: Thug.

🎵 California Love by 2Pac

The Last Song was from 2007. The Next Song called Shook Ones, Pt. II takes us into a Different era. All the Way to 1995.

🎵 Shook Ones, Pt. II by Mobb Deep

Just Like the Last Song, this Song was Released in 1995.

🎵 Gangsta's Paradise by Coolio

The Last and the Upcoming Song Both are Described as Dark Groovy.

APPARATUS, SYSTEMS AND METHODS FOR PROVIDING SEGUES TO CONTEXTUALIZE MEDIA CONTENT

CROSS REFERENCE TO RELATED APPLICATIONS

This application claims priority to, and the benefit of, U.S. Provisional Patent Application Ser. No. 62/724,831, filed Aug. 30, 2019, which is hereby incorporated by reference in its entirety.

TECHNICAL FIELD

Example aspects described herein generally relate to media content services, and more particularly to providing segues to contextualize media content.

BACKGROUND

Consuming media content is a widespread activity for many people and technology has repeatedly changed the way we create, listen and view it. Learning something related to the media content is sometimes a part of the experience itself.

In more traditional formats, some TV programs include text blurbs that appear on the screen when broadcasting music videos, and hosts of music radio shows (e.g., disc jockeys (DJs)) provide some background information or relevant news about songs, lyrics, and artists, between the playback of songs or videos. In a newer form of music consumption, for example, user interfaces of several music streaming services, such as Spotify, include an "About" section for artists, albums, and playlists. Sometimes, music services contextualize the songs further by displaying the lyrics, stories, or background information associated with certain parts of the songs (e.g., "Behind the Lyrics" feature on Spotify). The results are a type of storytelling, where the additional content provided links the media content items.

The recent increase in the consumption of media content through smart devices that have voice assistant capability introduces an opportunity to explore new user experience (UX) paradigms. Voice-enabled devices, including mobile devices and smart speakers have introduced a new paradigm of interaction to the mainstream, enabling a diverse and growing set of functionalities in different areas. A significant area of content consumption on such devices is music, where consumers are enabled to use voice commands to search for content and control the music playback. Despite the popularity of consuming music through voice, most of the current interactions are rather transactional and do not take advantage of conversational interactions or address music-related user needs other than for simple catalog search and playback control.

Some existing methods that attempt to provide a story generation, including those that implement computational planning involve using a graph in which the space of story events and the constraints of the progressions of a storyline are mapped. One technical problem with providing such a space of events, however, involves searching for the most appropriate contextual information about any one or two given media content items. Another technical challenge involves creating an experience like traditional radio shows. Particularly, there exists no known technical solution that adequately maintains the "flow" of media content (e.g., music), and balances the spoken words and songs. There also is no known technical solution for basing such information from user habits and interests.

It would also be desirable, therefore, to have an improved mechanism for providing additional information through voice enabled devices that are capable of receiving content from a media streaming service while users are, for example, listening to music, video, books and the like, particularly in an automated manner. It would also be desirable to be provided such additional information in a manner that enables an interactive narrative experience where the user can create or influence the progression of the unfolding augmentation (e.g., storyline) in an interactive manner.

SUMMARY

The example embodiments described herein meet the above-identified needs by providing methods, systems and computer program products for providing voice output storytelling. To achieve such a storytelling presentation, a method of creating, identifying, and playing segues along with media content item tracks (referred to herein simply as "tracks"), where the segues are the narration between the tracks, has been created. Segues can include information about the media content. Segues can be in the form of a text snippet. A sequence of tracks and segues is referred to herein as a "story".

The storytelling process has been automated, so when listening to media content on a media streaming service, the user still hears a narration between each track, which would create a story-like experience. A method includes finding a segue to place between two consecutive tracks. The method further includes creating a story comprising many tracks all linked by segues. Still further, the segues can be interactive with the user. The segue may ask the user a question and based upon the users' response, provide an appropriate next segue.

In use, a playlist or a selection of two or more tracks are selected. All possible segues between tracks are identified. Segues are selected so the same type of segue content is not played twice in a row, the length of the segue is appropriate, content is prioritized that fits the playlist type, and segues are found that make the most sense at a specific position. These factors are used to create a weighted score, which determines the best segue to play, for example, before a first track or between any two tracks, whether in a sequence of songs, a playlist, or listening session.

Segues are created by identifying basic metadata for an entity, such as the artist, album, song, release year, genre, or mood. Segues are also created by identifying derived data, such as first album, only collaboration between two artists, and other similar data; and qualitative data, such as facts about the artists and songs.

In an example implementation, there is provided a method of augmenting a group of media content items, comprising: forming a graph including a plurality of nodes and a plurality of edges, where each node represents a segue option at a position in the graph and each edge represents a connection between a first node in the graph at a first position and a second node in the graph at a second position; and finding a path in the graph.

The method can also include receiving a first media content item and a second media content item; and identifying at least one segue represented by a node in the graph that relates the first media content item to the second media content item.

In some embodiments the method includes assigning weights to the plurality of edges, and wherein finding the path in the graph includes choosing a path in the graph having a maximum sum of edge weights.

In some embodiments the method includes retrieving, from a grammar library, a plurality of grammars; and finding one or more matches of the grammars in the graph.

Another implementation provides a system for augmenting a group of media content items, comprising: one or more processors and one or more storage devices storing instructions that are operable, when executed by the one or more processors, to cause the one or more processors to: form a graph including a plurality of nodes and a plurality of edges, where each node represents a segue option at a position in the graph and each edge represents a connection between a first node in the graph at a first position and a second node in the graph at a second position; and find a path in the graph.

In some embodiments the one or more storage devices storing instructions that are operable, when executed by the one or more processors, to cause the one or more processors to: receive a first media content item and a second media content item; and identify at least one segue represented by a node in the graph that relates the first media content item to the second media content item.

In some embodiments the one or more storage devices storing instructions that are operable, when executed by the one or more processors, to cause the one or more processors to: assign weights to the plurality of edges, and find the path in the graph by choosing a path in the graph having a maximum sum of edge weights.

In some embodiments, the one or more storage devices storing instructions that are operable, when executed by the one or more processors, to cause the one or more processors to: retrieve, from a grammar library, a plurality of grammars; and find one or more matches of the grammars in the graph.

In some of the above embodiments, the first node and the second node are neighboring nodes. The at least one segue can represent information that relates two consecutive media content items. In addition, each grammar can be a sequence of segue types. Further, the group of media content items can be at least one of an album, a playlist, an artist, and an individual media content item.

In yet another implementation, there is provided a non-transitory computer-readable medium having stored thereon one or more sequences of instructions for causing one or more processors to perform one or more of the methods described herein.

BRIEF DESCRIPTION OF THE DRAWINGS

The features and advantages of the example embodiments of the invention presented herein will become more apparent from the detailed description set forth below when taken in conjunction with the following drawings.

FIG. 5A represents an example playlist in accordance with an example aspect of the present invention.

FIG. 8 illustrates a table of example types of segues, their logic description and samples for their realized text in accordance with an example embodiment of the present invention.

FIG. 10 illustrates examples of conversational augmentations according to an example embodiment of the present invention.

FIG. 11 illustrates an example excerpt of an augmented playlist according to an example embodiment of the present invention.

DETAILED DESCRIPTION

Figure 1:
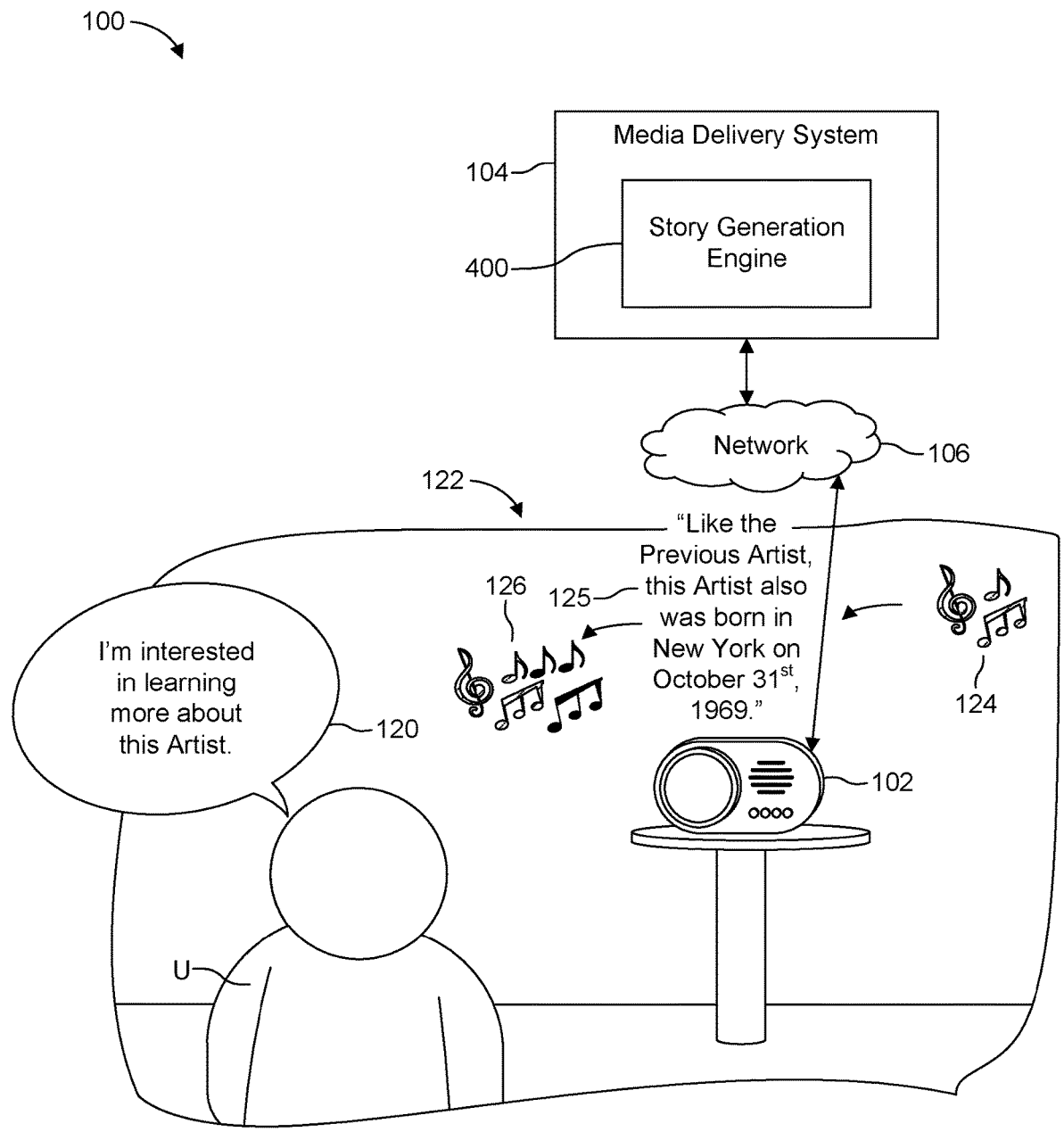
FIG. 1 illustrates an example media playback system for providing media content to a user in accordance with an example embodiment of the present invention.

The example embodiments of the invention presented herein are directed to methods, systems and computer program products for providing segues to contextualize media content, which are now described herein in terms of an example media playback device in the context of music consumption. This description is not intended to limit the application of the example embodiments presented herein. In fact, after reading the following description, it will be apparent to one skilled in the relevant art(s) how to implement the following example embodiments in alternative embodiments such as on other types of client devices operating as media playback devices and for other forms of media content other than music, such as videos, books, games, news, among others.

In addition, not all of the components are required to practice the invention, and variations in the arrangement and type of the components may be made without departing from the spirit or scope of the invention. As used herein, the terms "component" and "engine" are applied to describe a specific structure for performing specific associated functions, such as a special purpose computer as programmed to perform algorithms (e.g., processes) disclosed herein. The component (or engine) can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

Generally, a graph is used to represent a possibility space. A probabilistic approach is then taken to address the problem of searching for the most appropriate information. Particularly, a probability approach is taken, where the existence of certain nodes in the path make the selection of other nodes more or less likely. In some embodiments, augmentation material is generated initially in textual form. The textualized augmentation material is, in turn, output via synthesized speech along with a set of tracks (e.g., of songs, videos, etc.).

In one example implementation, a format of media content collection (also referred to as "media context") is defined to be the input. Media contexts can be configured to group one or more media content items and provide a particular context to the group. Some examples of media contexts include albums, playlists, artists, and individual media content items. The example implementations described herein are directed to augmenting a playlist-type media context, but it should be understood that the example implementations are not so limited and can apply to other types of media contexts as well.

Relevant background information and relationships for the tracks contained in the playlist are determined. In turn, from the determined background information, possible options are selected to be used as a subset between every two consecutive tracks. Every such piece of information that comes between two consecutive tracks is referred to herein as a segue. In an example implementation, a segue can be in the form of a text snippet. A sequence of tracks and segues is referred to herein as a "story".

A segue can represent a set of predefined properties and relations about one track. A segue can also represent a set of predefined properties and relations about two distinct tracks (e.g., two consecutive songs, two non-consecutive songs). In some embodiments a segue includes either a preference score, a positional preference, a natural language generation (NLG) template, or any combination of a preference score, a positional preference, and a NLG template.

A segue can be represented in code. In an example implementation, the segue has a segue type that is a class which can take two track objects (e.g., two song objects). If a determination is made that the class is a match for two track objects, the class is instantiated to be a segue object.

FIG. 1 illustrates an example media playback system 100 for providing media content to a user U in accordance with an example embodiment of the present invention. The system 100 includes a media playback device 102, a media delivery system 104, and a data communication network 106. The media delivery system 104 includes a story generation engine 400. The media playback device 102 operates to provide media content to a user U in the form of media output 122. Example media output 122 are also shown. As described herein, the media output 122 can be a first media content item 124 that is followed by a segue 125. Segue 125 is followed by a second media content item 126. Although not shown, the first media content item 124 can be preceded by a segue as well (e.g., a segue that provides an introduction to the first track, referred to herein as an introduction type segue). In some embodiments user U provides a user query 120 that dictates the content of the segue 125. In some embodiments the user query 120 provided by user U dictates the content of the segue 125 and the second media content item 126.

As described herein, the media playback device 102 can also be configured to receive the user query 120 and provide the media output 122 to the user U according to the user query 120. Media playback device 102 is configured to communicate with a system external to the media playback device 102, such as the media delivery system 104. The media playback device 102 can interact with the media delivery system 104 to process the user query 120 and identify media content in response to the user query 120. In some embodiments, the media playback device 102 operates to receive the media content that is identified and provided (e.g., streamed, transmitted, etc.) by the media delivery system 104. In some embodiments, the media playback device 102 operates to play the media content and generate the media output 122 using a media output device (e.g., a speaker) therein.

Figure 2:
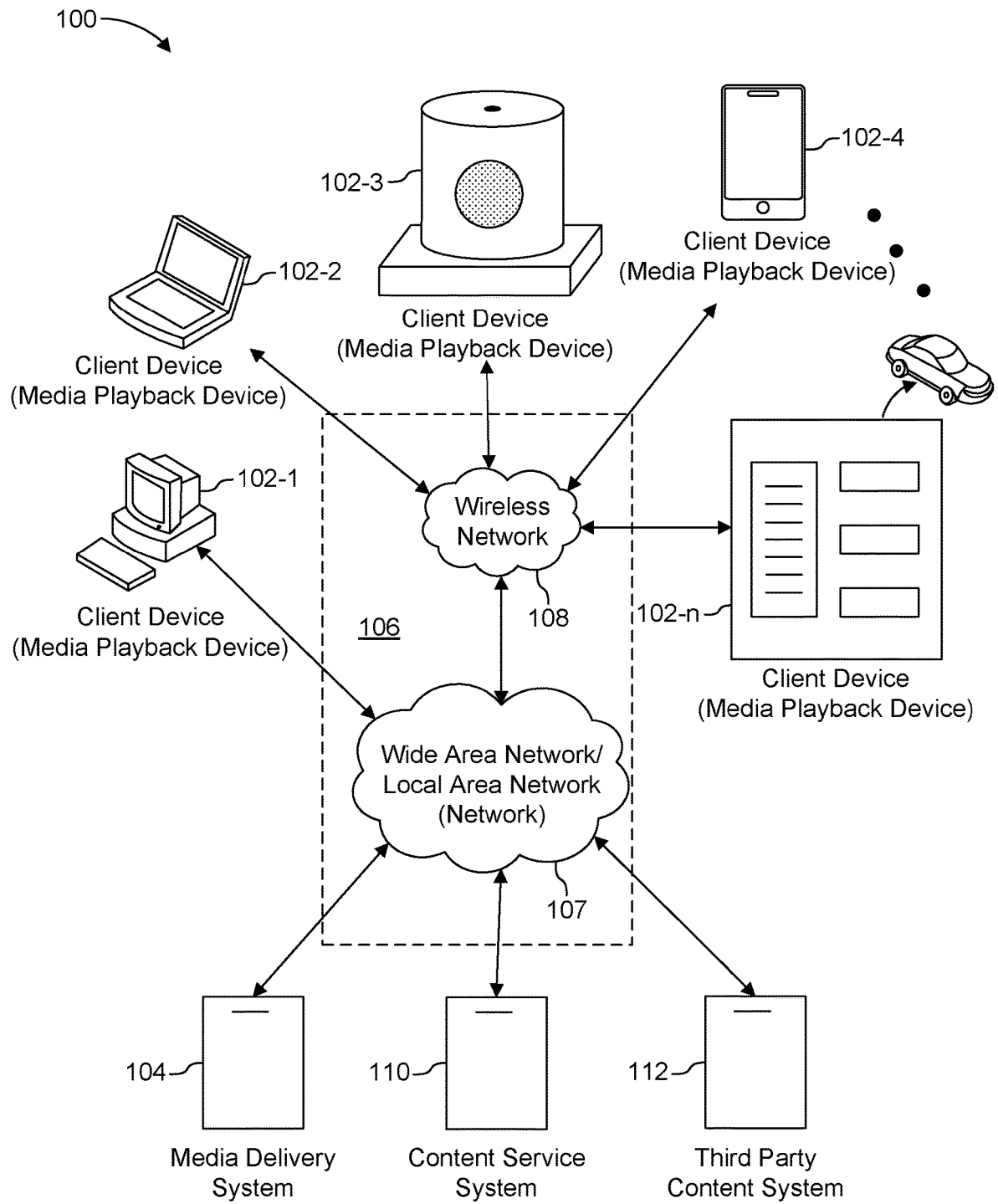
FIG. 2 illustrates example media playback system components for providing media content to a user in accordance with an embodiment of the present invention.

FIG. 2 is a representative view of a system 100 in which some embodiments of the invention may be implemented. System 100 of FIG. 2 includes wide area networks/local area networks ("LANs/WANs")—(LAN/WAN network) 107, wireless network 108, client devices operating as media playback devices 102-1, 102-2, 102-3, 102-4, . . . , 102-n (referred to collectively and individually as media playback device 102), a media delivery system 104, a content service system 110, and a third party content system 112.

LAN/WAN network 107 and wireless network 108 are referred to collectively and individually hereinafter as network 106. The network 106 is a data communication network that facilitates data communication between the media playback device 102 and the media delivery system 104.

Generally, the media delivery system 104 operates to enable media playback devices 102 to receive content. In various embodiments, such content may include, but is not limited to media content such as music, podcast, video, games, books and the like, as well as webpage content, advertisements, professionally generated content (non-UGC content), search results, blogs, and/or any of a variety of user generated content for access by another client device. In an example embodiment, the media delivery system 104 generates playlists which contain lists of media objects that are used to retrieve corresponding content from content service system 110 or third party content system 112. In some embodiments, the lists of media objects (e.g., music objects, segue objects, video objects, game objects, book objects and the like) are in the form of media contexts (e.g., playlists, albums, etc.). In some embodiments, the media delivery system 104 further operates to enable media playback devices 102 to receive additional content (e.g., other media content items or segues) from third parties via third party content system 112 which can be played back in conjunction with the content provided by content service system 110. In some embodiments, the additional content provided by third party content system 112 is played back between individual media content items provided by content service system 110. In other embodiments the additional content provided by third party content system 112 is played back in parallel with the content provided by content service system 110 (e.g., as an overlay media content item).

In some embodiments, media delivery system 104, content service system 110, and third party content system 112 are the same system component. In some embodiments, media delivery system 104, content service system 110, and third party content system 112 are different components.

An example of the media playback device 102 and an example media delivery system 104 in accordance with the present invention are illustrated and described in more detail below with reference to FIG. 3.

Example Implementation

Figure 3:
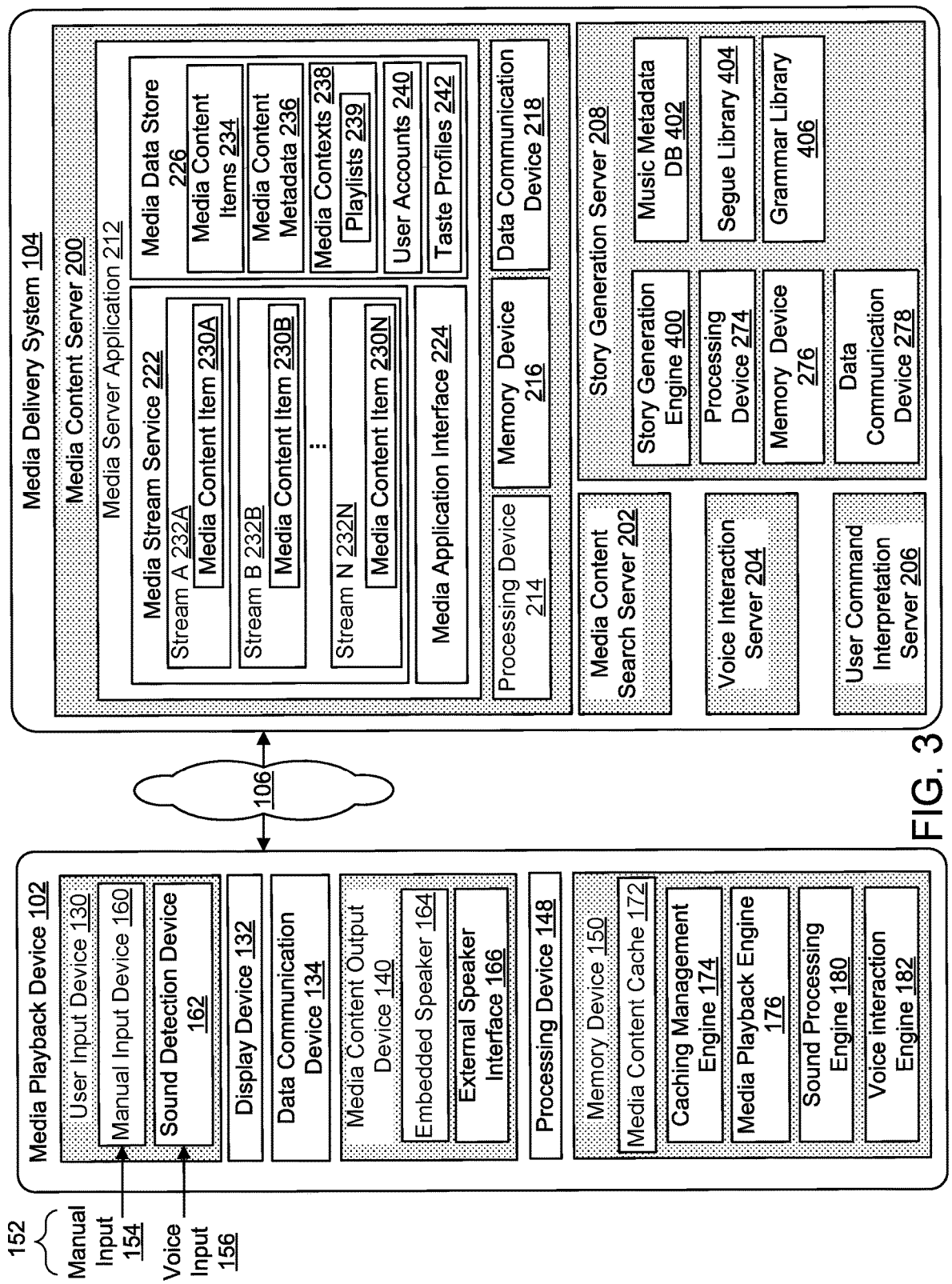
FIG. 3 is a representative view of a system in which some embodiments of the invention may be implemented.
Figure 4:
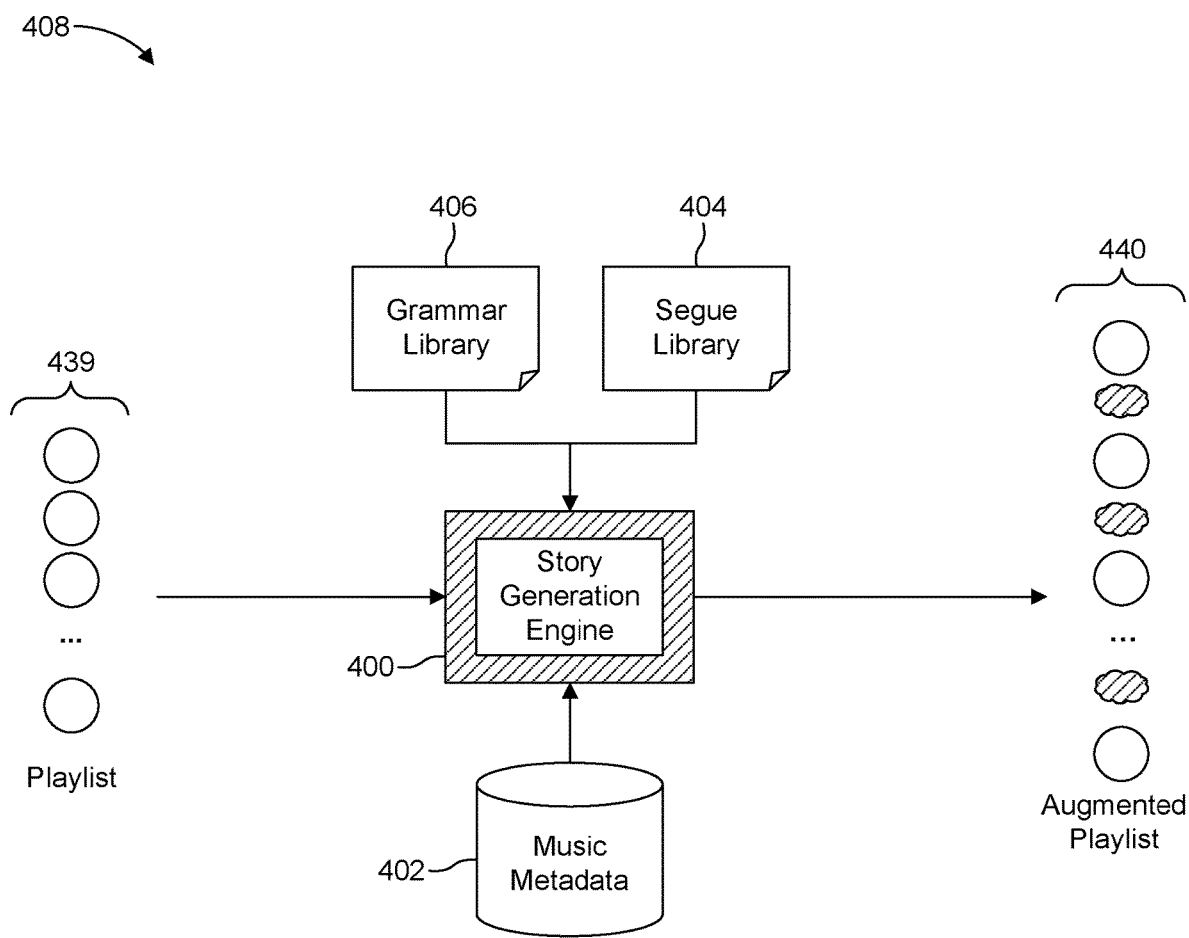
FIG. 4 depicts a story generation server 208 for providing segues to contextualize media content in accordance with an example embodiment of the present invention.

FIG. 4 depicts a story generation server 408 for providing segues to contextualize media content in accordance with an example embodiment of the present invention. Story generation server 408 includes a story generation engine 400, a music metadata database 402, a segue library 404, and a grammar library 406. Story generation server 408 can also include a memory device such as memory device 276 of FIG. 3 and a processing device such as processing device 274 of FIG. 3. Story generation server 408 can also include a data communication device such as data communication device 278 of FIG. 3.

Story generation engine 400 can be embodied as instructions stored in a non-transitory memory device, which when executed by a processing device, causes the processing device to generate one or more segues and insert one or more segues between tracks of a playlist 439, thereby generating an augmented playlist 440.

In some embodiments, the original order of playlist tracks is maintained to preserve possible semantic reasons behind curation by playlist creators. However, this is not a requirement. The order of the playlist tracks may be modified, for example, to provide more appropriate semantics.

In some embodiments, story generation engine 400 can insert one or more segues between content grouped in other types of media contexts.

As shown in FIG. 4, story generation engine 400 is configured to receive playlist 439. The playlist can be received from a client device application (e.g., a music playback device 102 of FIG. 1, 2 or 3) in the form of a uniform resource identifier (URI) (e.g., spotify:album:27ftYHLeunzcSzb33Wk1hf). In some examples the playlist is retrieved from a music playback device in the form of a uniform resource locator (URL) (e.g., https:*//open.spotify.com/album/27ftYHLeunzcSzb33Wk1hf).

In this example embodiment, every piece of information that comes before a media content item (e.g., a track for a song) or between two consecutive tracks (e.g., two consecutive tracks corresponding to two songs) is a segue. In some embodiments, each segue describes a predefined property, such as some information or characteristic, of a next track or a relationship between a current track and a next track.

FIG. 5A represents an example playlist 439 in accordance with an example aspect of the present invention. Playlist 439 includes tracks Track 0, Track 1, Track 2, . . . , Track n−1, Track n, where n is an integer. As shown in FIG. 5A, the playlist commences with Track 1, and ends with Track n.

Optionally, the first track, Track 0, can be a dummy track. Also optionally, the last track, Track n, can be a dummy track. In such embodiments, a dummy track, which bears no media background information, is added before the first song and after the last song, in order to facilitate the implementation of the technical solution for finding a path in a graphical representation of the story possibility space in computer code, where each path starts from a single starting and ends at a single ending point.

In the graphical representation of the story possibility space connecting the segue options in every position in the group of media content items to the segue options of the next position of the group of media content items, a graph with edges is yielded. In other words, the graphical representation of the story possibility space is a graph representing all possible combinations of sequences of segue options that can be chosen for augmenting a group of media content items (e.g., a playlist, an album). Thus, every path from a first position of the graph (e.g., a beginning of a playlist) to a second position of the graph (e.g., an end of a playlist) represents a possible augmentation of the group of media content item.

Figure 5B:
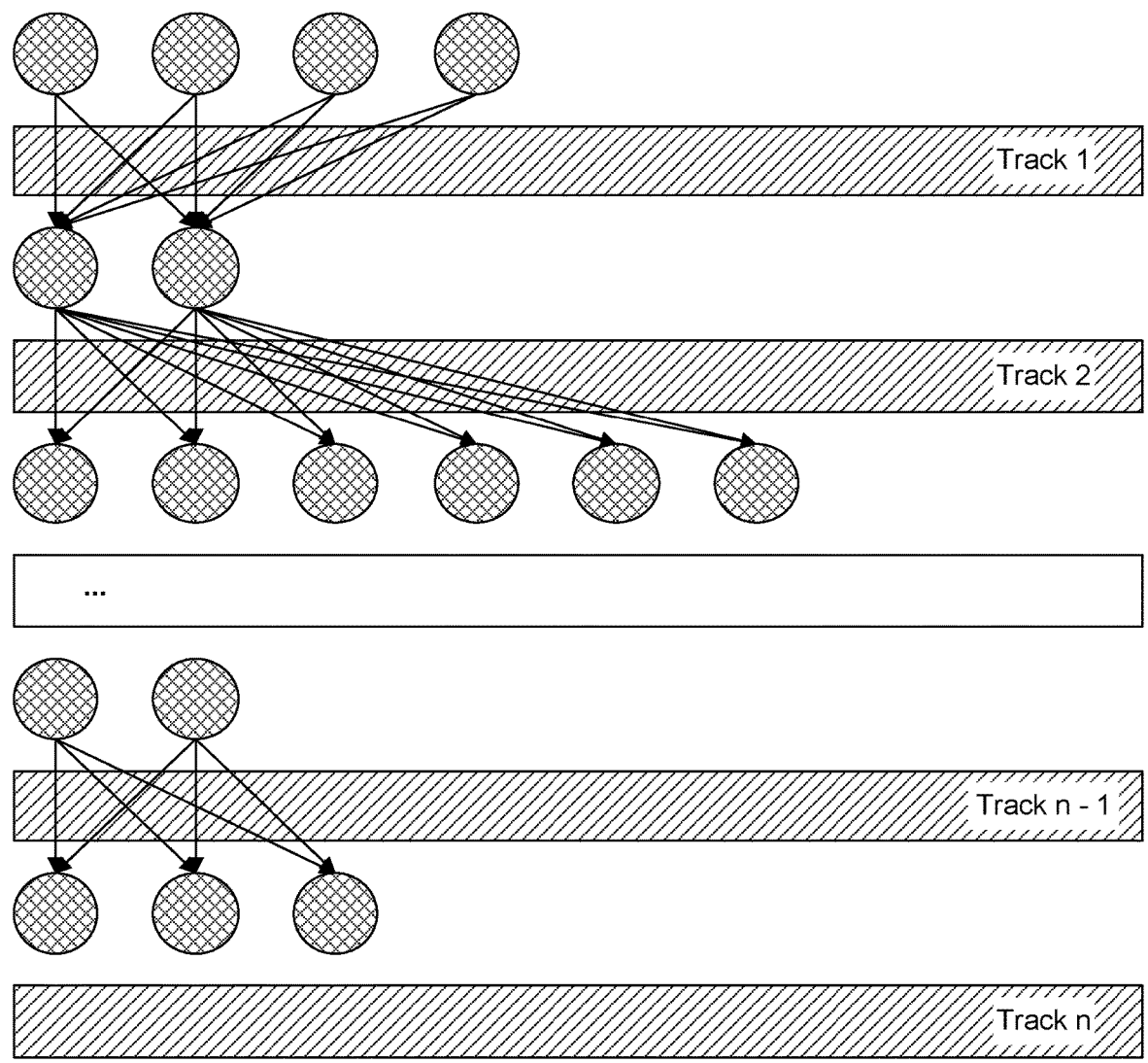
FIG. 5B illustrates an example story possibility space of a given playlist in accordance with an example embodiment of the present invention.

FIG. 5B illustrates an example story possibility space 500 of a given playlist in accordance with an example embodiment of the present invention. Story generation engine 400 of FIG. 4 operates to identify, for each two consecutive tracks, one or more segue options 502. In other words, for a plurality of tracks (Tracks) story generation engine 400 is configured to determine a segue option 502 between Track i and Track i+1 (e.g., Track 1 and Track 2 of FIG. 5B), where i is an integer. In some cases multiple options exist (e.g., same release year, a fact about the artist, or a shared genre).

FIG. 5B further illustrates a graph including a plurality of nodes and a plurality of edges, where each node represents a segue option at a position in the graph and each edge represents a connection between a first node in the graph at a first position and a second node in the graph at a second position. As shown in this example, the first position and the second position are neighboring positions. A position is a location of a set of nodes in the graph relative to a media content item.

The story generation engine 400 is further configured to generate a segue in the form of a text snippet for a segue option. As explained above, a sequence of tracks and segues are referred to as a story. Thus, given a playlist, story generation engine 400 operates to identify all possible variations of segues (or snippets of text) that can be inserted between two of the n tracks and before a first track.

Figure 6:
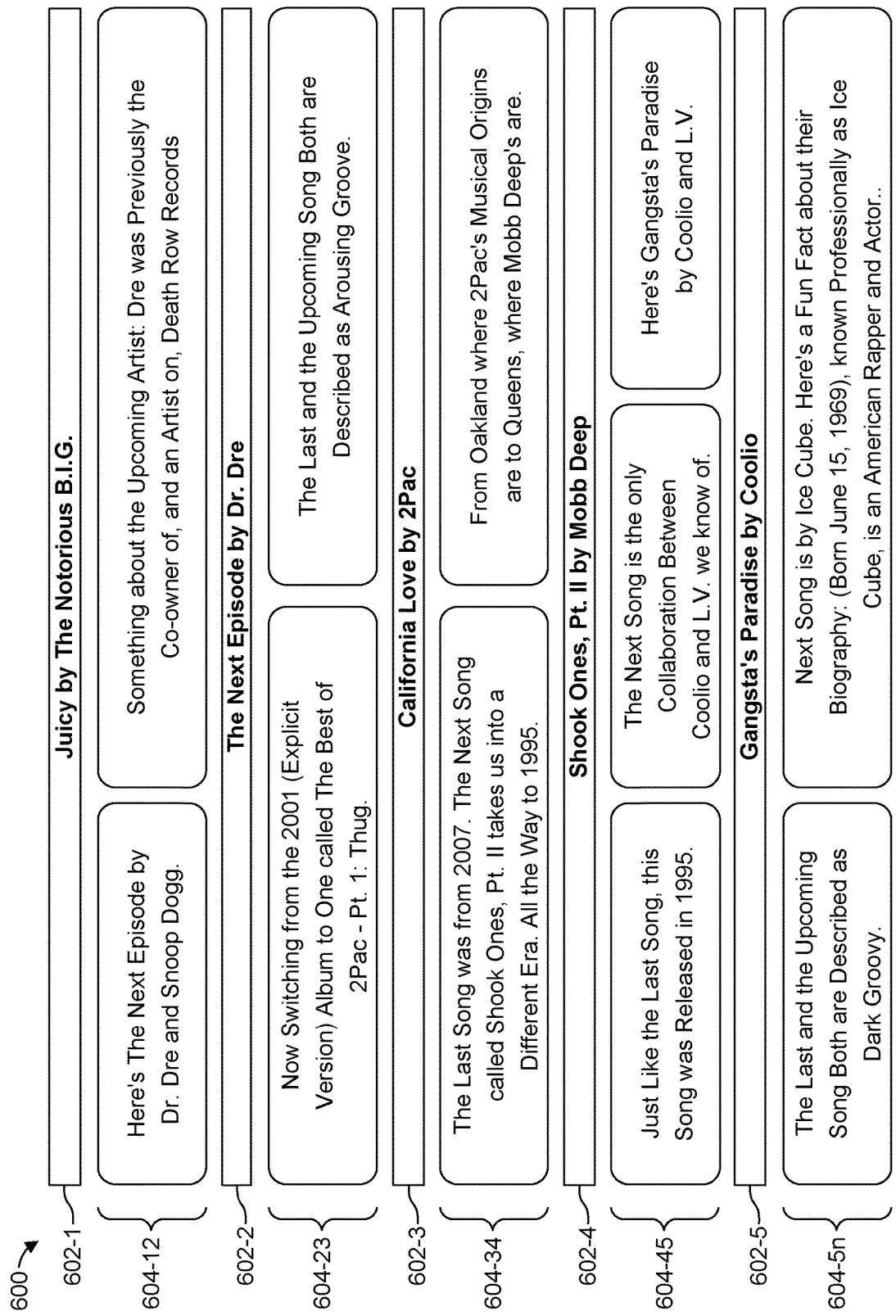
FIG. 6 illustrates an example story possibility space illustrating plural tracks and candidate segues that can be inserted between each of the plural tracks.

FIG. 6 illustrates an example story possibility space 600 illustrating plural tracks, 602-1, 602-2, 602-3, 602-4, and 602-5, and candidate segues 604-12, 604-23, 604-34, 604-45, and 604-5n that have been generated based on a plurality of candidate segues. Each of these candidate segues can be inserted between two corresponding tracks. In some embodiments more than one segue is inserted between two tracks. In other embodiments, just one segue is inserted between two tracks.

Music Metadata

In some embodiments, story generation engine 400 of FIG. 4 receives media content metadata such as metadata stored in a music metadata database 402 of FIG. 4. Metadata also can include metadata stored in the media content metadata 236 described below in connection with FIG. 3. In an example implementation, the set of media content metadata 236 includes acoustic metadata, cultural metadata, and explicit metadata as described below in connection with FIG. 3.

Figure 7:
FIG. 7 shows a table of some sample entries of metadata about songs and artists according to an example aspect of the present invention.

FIG. 7 shows a table of some sample entries of metadata about songs and artists according to an example aspect of the present invention. Particularly, FIG. 7 shows a table of some sample entries of cultural metadata including qualitative facts about songs and artists. In this example the metadata includes short extractions from publicly available sources of background information, such as an item properties 702 and applicable entities 704. Example segues 706 are included in the table illustrated in FIG. 7 as well. Item properties 702 can be string properties constrained to a predefined list of valid values and stored as integer codes in a database. Applicable entities 704 also can be string properties constrained to a predefined list of valid values and stored as integer codes in a database. Example item properties 702 include name, musical origin, genre, mood, and/or qualitative fact. Applicable entities 704 can include artist, writer, composer, and other such entities involved with media content creation, as well as an album, a song, a playlist, and the like.

Segue Library and Grammar Library

FIG. 8 illustrates a table of example types of segues, their logic description and samples for their realized text in accordance with an example embodiment of the present invention. A collection of segues is referred to as a segue library. A segue can have a segue type 802. A segue type 802 has a corresponding logic description 804. Each segue has a natural language generation (NLG) template 806 resulting in textual output referred to as realized text 808. Realized text 808 is the result of a realization process performed on the NLG template and corresponding metadata. That is, realized text 808 is the result of a realized segue, which involves creating an actual text in a human language (English, French, etc.) from a syntactic representation of the NLG template and metadata.

A NullSegue segue is a segue type that indicates that there is no realized text 808. In some embodiments, a next playlist item such as a song can be played after a NullSegue-type segue. Accordingly, a NullSegue type segue has no corresponding NLG template as indicated in FIG. 8. A MundaneSegue-type segue is a segue type that introduces a next song ("Next song is called 'Song Title' by 'Artist'"). An ArtistOriginJump-type segue is a segue type that explains a difference between the musical origin of an artist of the previous song and the musical origin of an artist of the next song (two consecutive songs). A SameYearSameArtist-type segue is a segue type corresponding to a fact that the previous song and the next song share, such as the same artist and release year. Other types of segues can be implemented. For example in some embodiments, segues can be categorized as playlist openers, interesting facts, semantic relations, mundane segues, and the like.

A playlist opener introduces various types of playlists (e.g., "This Playlist is dedicated to a specific era. Let's explore 90s Hip Hop!").

Interesting facts can be qualitative facts or quantitative facts. A quantitative-type interesting fact can include, for example, specific relationships found in metadata corresponding to a song. A qualitative-type interesting fact can include, for example, text snippets about the song that have been prestored. In some embodiments, heuristics can be performed on the qualitative interesting facts to connect the qualitative interesting facts to other interesting facts (e.g., other qualitative-type interesting fact or other quantitative-type interesting facts). Examples of heuristics that can be used include cosign similarity, Google Word2Vec, and the like.

Semantic relations type segues represent more standard relationships between music entities, such as whether a song is a remix, whether a next song is by the same artist, whether the next song has a different mood to it, and the like.

As described above, mundane type segues are simple connections that can be used to connect two songs. An example mundane segue is a segue that introduces a next song.

Figure 9:
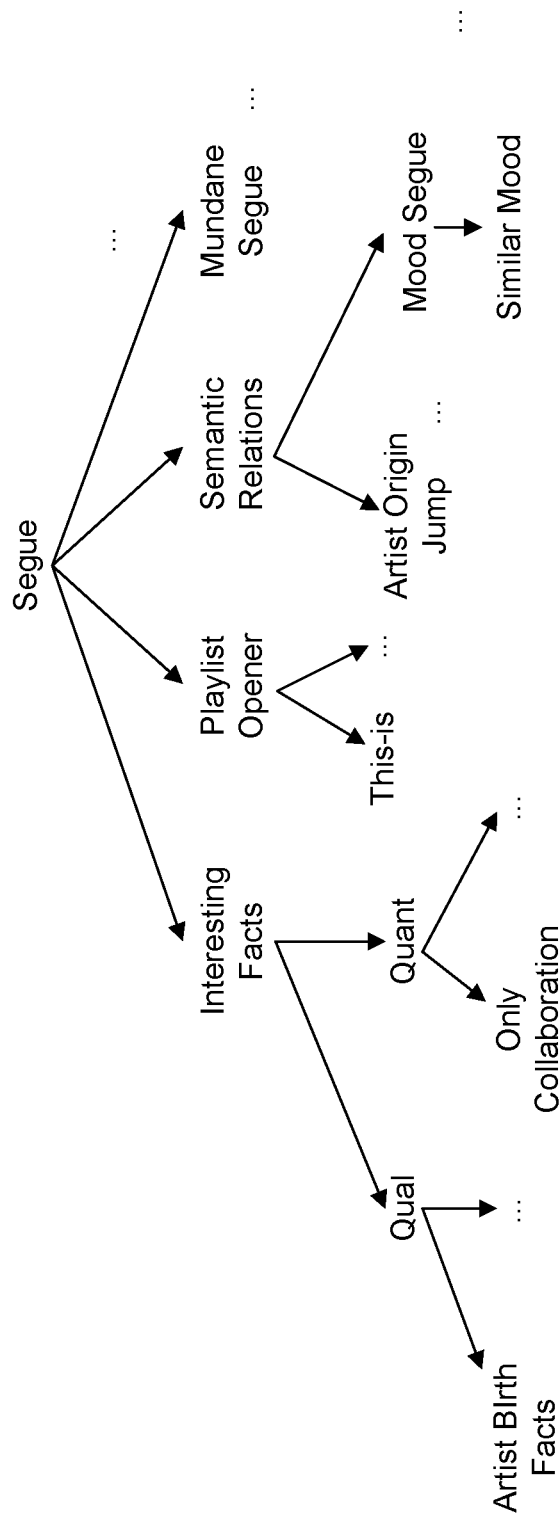
FIG. 9 illustrates a segue tree according to an example embodiment of the present invention.

The segues represent a set of predefined properties and relations about songs that are represented in code, where every segue is a class. In some embodiments, the segues have a hierarchy. FIG. 9 illustrates a segue tree 900 according to an example embodiment of the present invention. In an example embodiment depicted in FIG. 9, a construct is defined to prioritize authored sequences of segues. For instance, by preferring a sequence of (i) interesting fact: artist fact ArtistFact, (ii) interesting fact: artist origin ArtistOriginJump, and (iii) interesting fact: artist fact ArtistFact, an augmentation can focus on the background of songs and their artists. In an example embodiment, a predetermined sequence is set by selecting one or more segue types or properties corresponding to the preference.

In some embodiments, the leaf segues, for example such as the leaf segues depicted in FIG. 9, can be instantiated. Leaf segues that can be instantiated are, for example, the segue types 802 discussed above. In some examples, instantiation happens with one or two track (e.g., song) objects. After instantiation, a segue type becomes a segue object.

Generating a Sequence of Segues

Figure 5C:
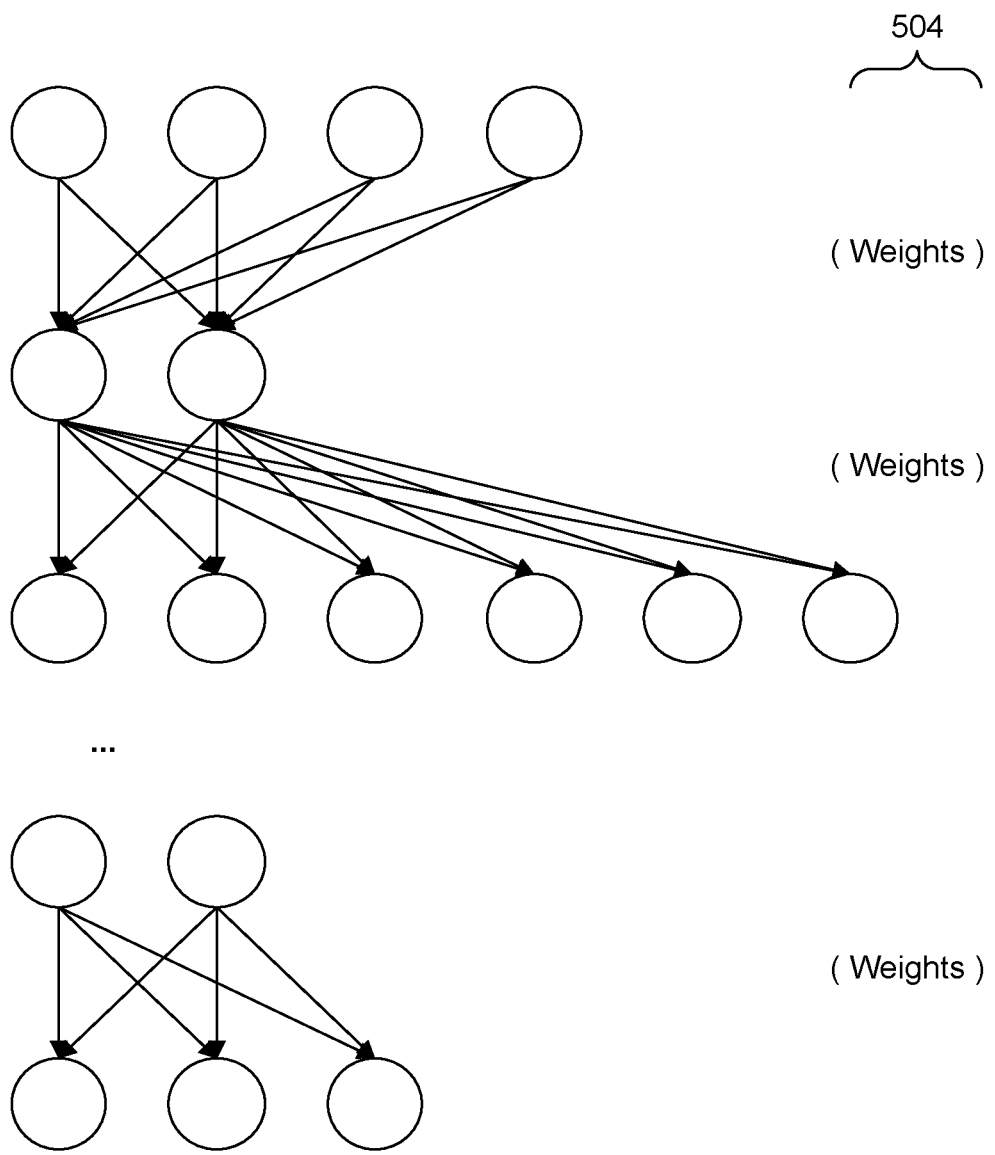
FIG. 5C represents an example story possibility space of a given playlist and a step of assigning scores as weights to the edges according to an example embodiment of the present invention.
Figure 5D:
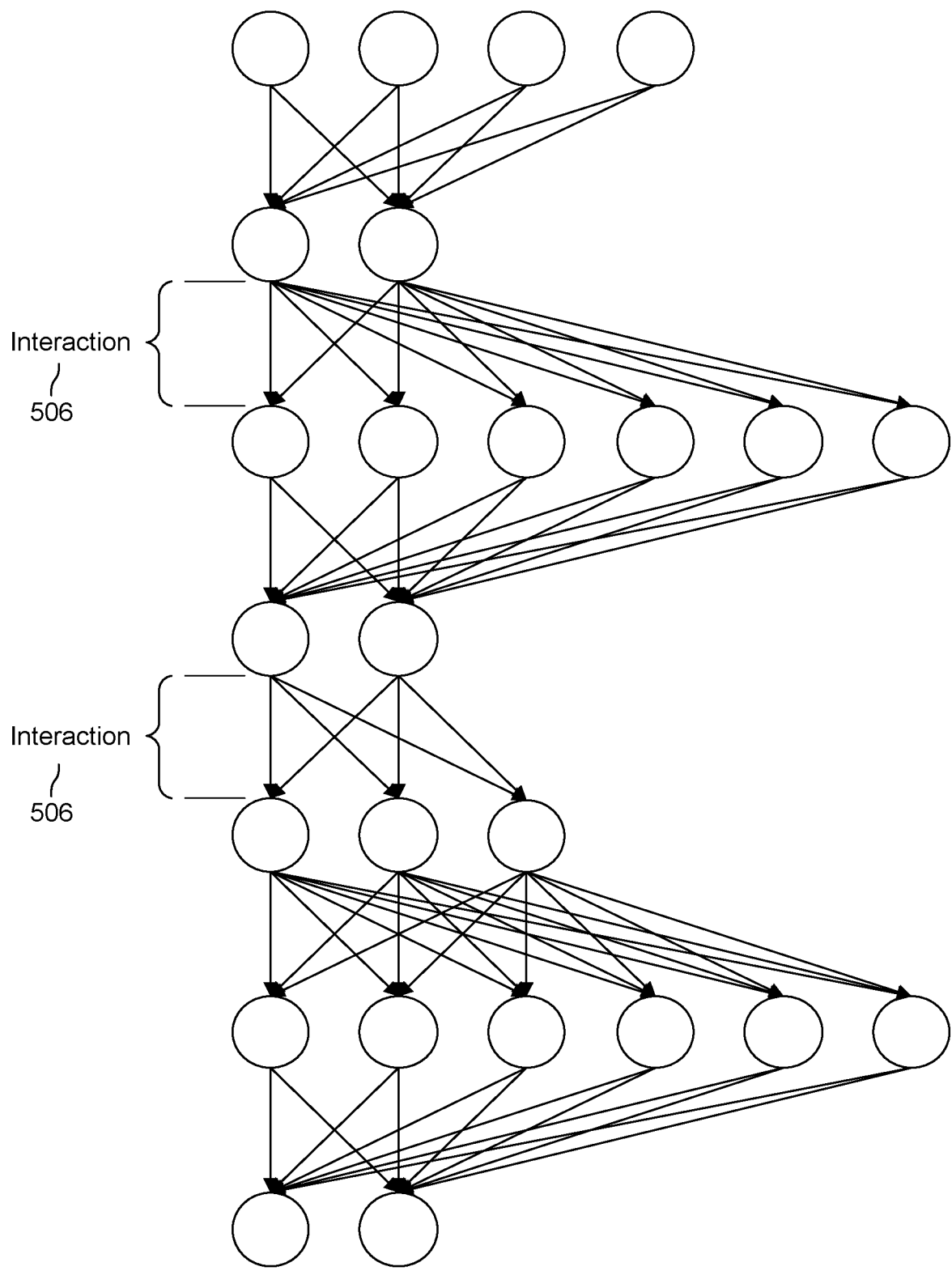
FIG. 5D illustrates a step of determining points of interaction in accordance with an example embodiment of the present invention.
Figure 5E:
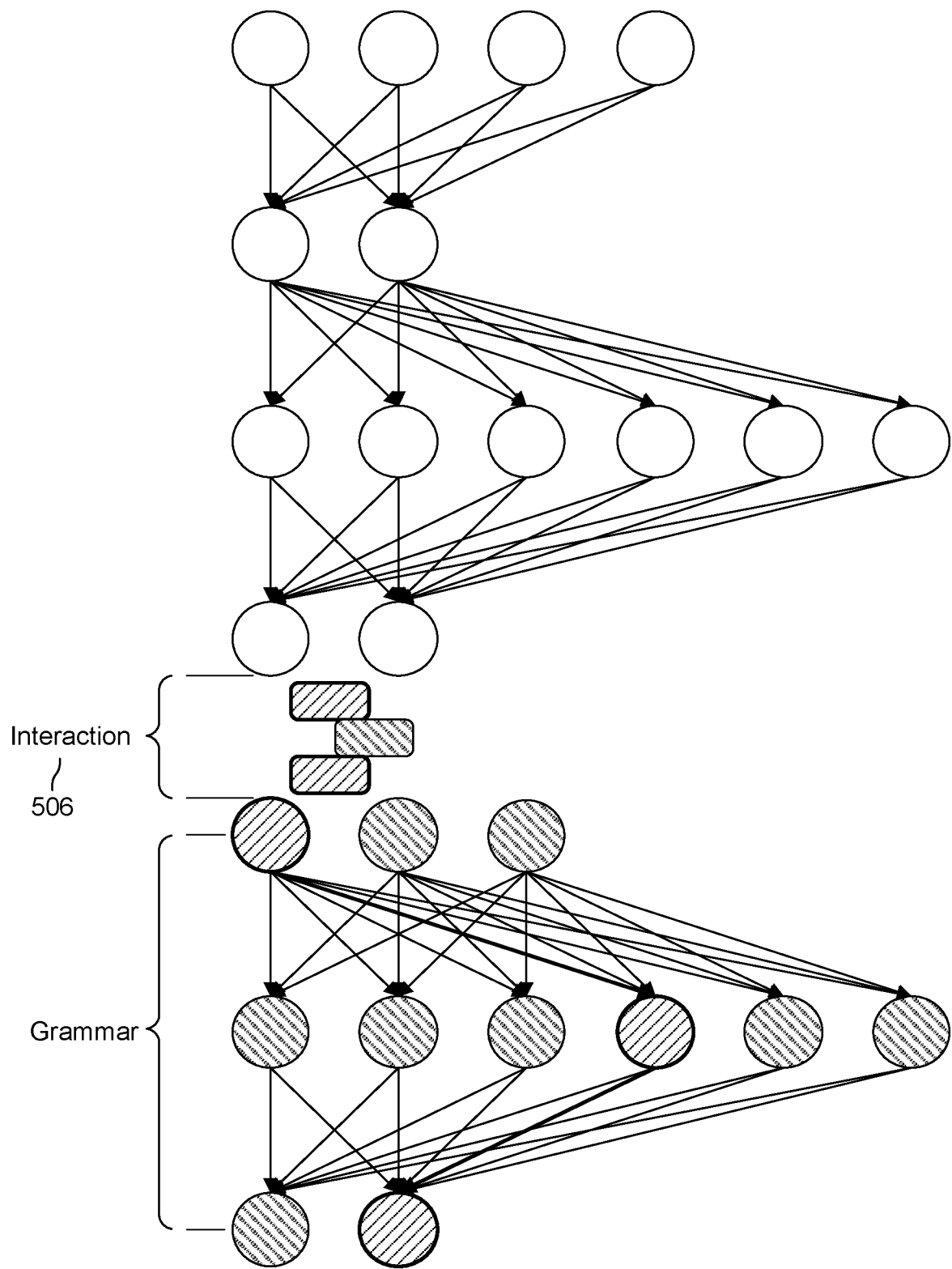
FIG. 5E illustrates a step of determining grammars as sequences of segue types in accordance with an embodiment of the present invention.
Figure 5F:
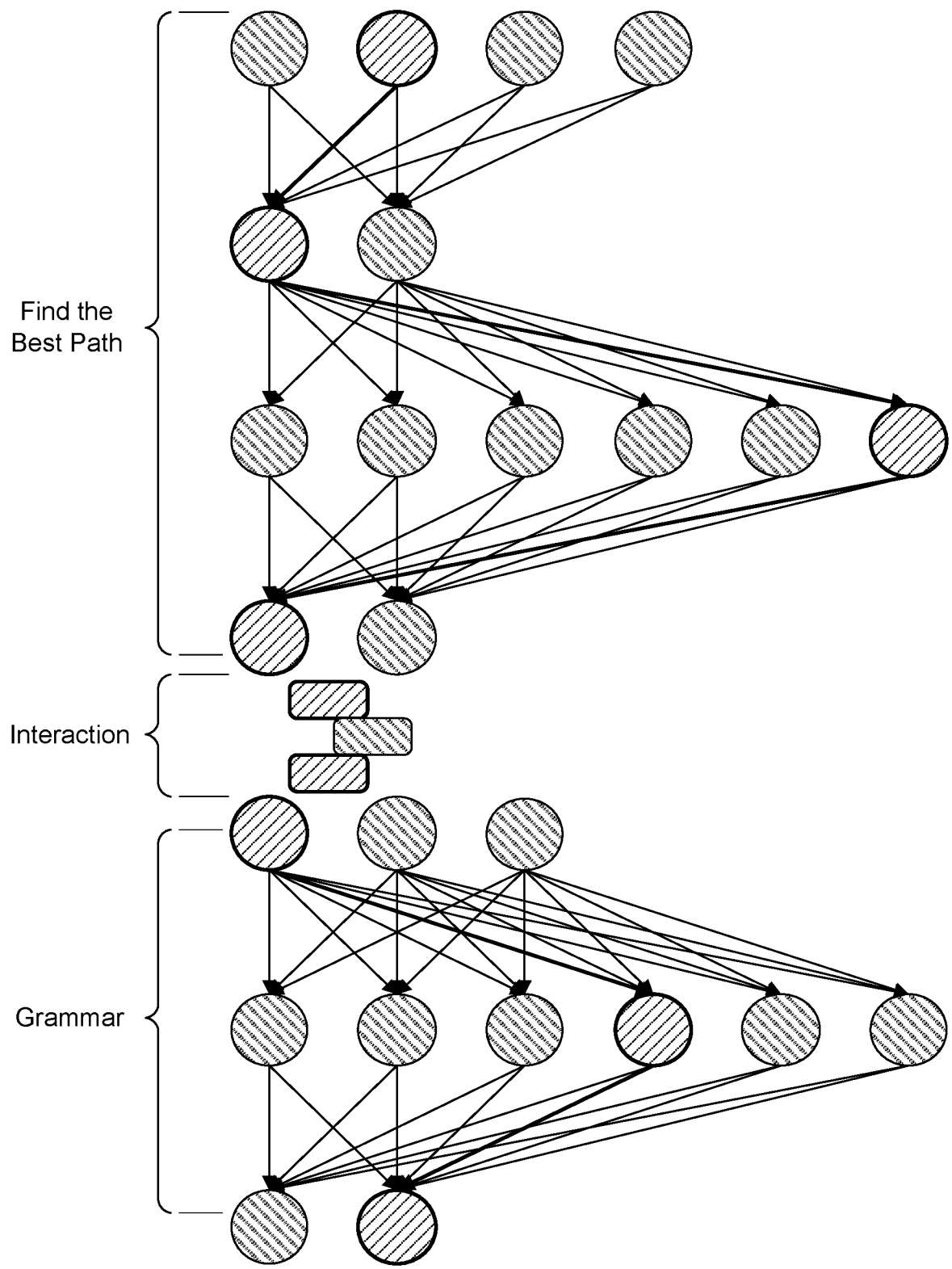
FIG. 5F illustrates the step of finding a best path in a graph for remaining parts using a weighting function in accordance with an example embodiment of the present invention.

One technical problem now becomes selecting a subset of potential segues to be included in a story (e.g., corresponding to a path in the story possibility space graph described herein in connection with FIG. 5F). One example solution to this problem follows.

In an example embodiment, story generation engine 400 accesses from music metadata database 402 metadata about songs, artists, and albums, etc., appearing in a playlist. In turn, story generation engine 400 searches for all the matching segues in the segue library for every two consecutive songs which results in a list of segue options for each such position. For the entire playlist, a list of these segue options is obtained, which is referred to as a story possibility space. Each item in the list corresponds to a position in the story possibility space graph. Given that the choice of a segue at each position in this space is independent of other positions, the story possibility space forms a graph and a search problem for finding a sequence of augmentations. The technical problem thus becomes that of finding the best path in this graph. To do so, story generation engine 400 uses a set of heuristics and preferences which are reflected in a weighting function illustrated below as equation 1. Scores are assigned as weights to the edges that represent transitions in the graph. FIG. 5C represents an example story possibility space of a given playlist and a step of assigning scores assigned as weights 504 to the edges, according to an example embodiment of the present invention.

$$\text{weight}(s_1, s_2) = \text{diff}(s_1, s_2) + [s_1^{pref} + s_2^{pref} - \text{lengthiness} + \text{silence\_reward} + \text{playlist\_reward} + \text{positional\_preference} \quad (1)$$

$s_1$ and $s_2$ are segue options. Several variables enable weighting absolute and relative preferences. $\text{diff}(s_1, s_2)$ enables avoiding repetition between consecutive segues. Static "segue preference scores" $s_i^{pref}$ give specific segues preference. In some embodiments, segues that have been authored are given preference. For example, a segue that has been authored to point out a change of genre between two consecutive songs can be provided a higher preference than a segue that states the title and artist of the next song. Hence if the value corresponding to the length of the text is greater than a predetermined threshold, it can be given a lower preference rating. The value lengthiness represents a measure of the length of realized text of a segue. Consequently, as illustrated in equation 1 above, the value corresponding to lengthiness punishes a segue if it has a long text. The value corresponding to silence_reward is a fixed value that rewards a graph edge if the first segue connected to the graph edge meets a predetermined threshold and the second segue connected to the graph edge is a NullSegue. Thus, the value corresponding to silence_reward rewards a graph edge if the previous segue is relatively long but the next segue is NullSegue. The value playlist_reward represents that some segues fit better to a specific type of playlist, such as ArtistQualFact in artist-focused playlists. positional_preference is a value representing a reward given to a graph edge leading to a node having a particular segue type that has been prespecified as a preferred segue type for a particular position. positional_preference is used for segues that only make sense at a specific part of a playlist. For example, a playlist introduction with a short authored description only makes sense at the beginning.

In some embodiments, a position between the songs can be determined to initiate an interaction with the user. The position can be chosen based on the contents of the segue options available for the next position in the playlist. For instance, the system can consider interactivity for particular types of segues. As another example, if there exists large semantic differences (e.g., how different the segues are) between at least two of the segue options for the next position, that information can be used as an opportunity to interact. This semantic distance, for instance, can be estimated by the distance between the types of two segue options in the segue type tree in FIG. 9.

In some embodiments, the choice of interactivity points could be made based on, or affected by, a model of user habits and preferences of interactivity, a user's music playback context and situation (e.g. alone or with other people, or, headphones or speaker), the relationship between the models of user interest in music-related artifacts and the contents of the segue options, among other things. This interaction, can consists of, for example, a question that the story engine can ask the user, and a response given by the user through the voice medium or a screen element (a user interface (UI) button). The question can be about the background information about songs and the corresponding artist. The question can also engage a user in various ways. In an example implementation, for instance, the question can ask a user about the contents of the next segue, in order for the user to guess a fact about the background information before the next segue is played. This sequence can add to the playfulness of the experience and make it more engaging. An example is outlined in the first row of FIG. 10.

In some embodiments, the next segue can change based on a response received from a user to a system question about a preference of segue content, or a question that answering it implies a preference of segue content. This preference can then be reflected in the next segues (e.g., for the immediate next segue or for a sequence of segues). An example is outlined in the second row of FIG. 10.

In some embodiments, the potential segues depend on the interactions. FIG. 5D illustrates a step of determining points of interaction in accordance with an example embodiment of the present invention. As shown in FIG. 5D interactions 506 all suitable points of interactions are determined.

In an example embodiment, there is enabled interactivity with a playlist. In some embodiments, a user can be asked a question. The user, in turn, can respond with a response. The story generation engine 400 processes the response to determine the next segue. In an example implementation, an interaction point is a position between songs where a user is prompted. For example, a user can be prompted "Question! Are you more interested in the artist's background or about this genre?" Depending on the response, the story generation engine 400 inserts the appropriate segue. For example, if the user response is "artist" then the story generation engine 400 can generate a qualitative fact about the artist (e.g., "Here's a fun fact about their biography: this artist was born on Feb. 20, 1988, in Saint Michael, Barbados"). If on the other hand the user response is "genre", then the story generation engine 400 can generate a segue corresponding to that same genre (e.g., "The last and the upcoming song both are described as dark pop intensity.").

In some embodiments, the interactions can be used to steer a choice of media content (e.g., a media content item such as a song) that will be played back next based on a response (or responses) of a user to the interactive question (s).

FIG. 5E illustrates a step of determining grammars as sequences of segue types in accordance with an embodiment of the present invention. Grammars are sequences of specific segues types, in a particular order, that have been predetermined to form a sequence. In one aspect, such sequences are determined as follows.

Given a weighted graph, initially a search is performed for any possible grammar matches. Every grammar has a length. This length is the length of a segue (type) sequence it contains. A grammar match is determined by comparing every grammar to all of the different subsets of the graph (subgraphs) of the same length which also correspond to a subset of the playlist of the same length. In each instance of this comparison, all segue options at every position in the subgraph at hand are compared to the corresponding segue types declared in the grammar. If there is a matching segue option in the subgraph that has a type declared in the corresponding position in the grammar, a positional match is achieved. If a positional match is achieved for the entirety of the length of the grammar with a subgraph (which has the same length) then that subgraph is a match for that grammar. The sequence of these positional matches corresponds to a path in the subgraph that matches the whole grammar. Once a match is found, the match is selected. In an example implementation, a grammar is a match if there exists a path in a sub-graph of the story possibility space, where the sequence of nodes in that path matches the grammar's sequence of segue types. Edge weights do not have a role in finding a grammar match. If two grammars overlap, the path representing one of them is chosen at random.

FIG. 5F illustrates the step of finding a best path in a graph for remaining parts using a weighting function in accordance with an example embodiment of the present invention. Initially, as described above, possible interaction points are first located. In turn, a determination is made as to how many interaction points to choose in one playlist (e.g., which in the example shown in FIG. 5F is one (1) interaction point). This interaction point is chosen randomly from all possible interaction points. The choice of interaction point creates two different sections (subgraphs) of the main graph for which no path is determined (if there are more interaction points, more subgraphs are created). In turn, grammar matches for these subgraphs are found. A grammar match can be found for any portion (smaller subgraphs) of the subgraphs. If grammars are matched, then a path is chosen (as described above) that each grammar yields. Next, there are still (potentially large) sections of the main graph (potentially many subgraphs) for which a path does not yet exist. At this point, the weighting function and edge weights can be used. For the portions of the story possibility space where no grammar match is found, the edge weights are used to find the best path, for example, one with the heaviest sum of weights.

Weights can be used to prevent immediate repetition as described above. In some embodiments other algorithms for path findings can be used to avoid repetition in relatively longer sequences. And in some embodiments, a path finding algorithm that does not allow for repetition of segue types can be used in every instance of path finding.

For example, to avoid repetition of a segue, if a given portion of the overall graph that needs pathfinding is larger than a predetermined number of playlist positions (e.g., 5 playlist positions), the path step is located by steps in windows of a predetermined size (e.g., a window size of 5).

In doing so, each such window will not contain any segue types that exists in a previous window, hence avoiding local repetition of segue types.

Referring to both FIGS. 5D and 5F, to exemplify conversational interactions, story generation engine 400 identifies possible interaction points which can trigger a short dialog and let a user response determine which segue option comes next. This is accomplished by checking against one or more logic definitions, e.g., if there are specific types of segues in the next list of segue options. FIG. 10 illustrates examples of conversational augmentations according to an example embodiment of the present invention.

After the full graph path is determined, story generation engine 400 uses the realized segue text of the segues in the chosen path, and inserts these segue texts between the songs.

FIG. 11 illustrates an example excerpt of an augmented playlist according to an example embodiment of the present invention.

Advantageously, the present invention can generate augmentations for any given playlist as long as it has access to the metadata for the songs in that playlist. It should be understood that while the example embodiments described above focus on playlists based on an artist, a genre, or listener popularity, other lists can be processed using story generation engine 400 as described above and still be within the scope of the invention.

Process for Generating Augmented Playlists

Figure 12:
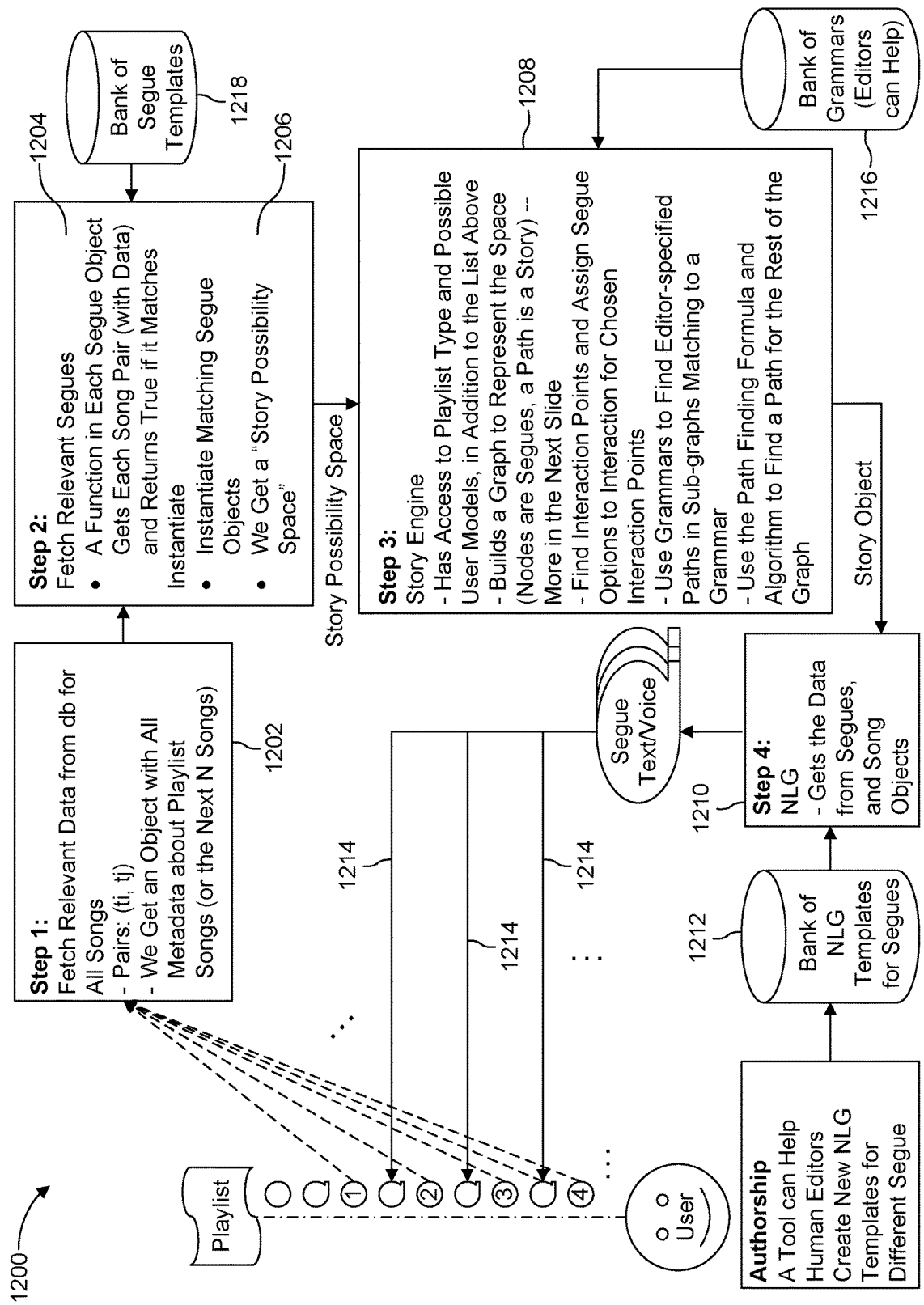
FIG. 12 is a diagram of an architecture for generating augmented playlists in accordance with an example embodiment of the present invention.

FIG. 12 is a diagram of an architecture 1200 for generating augmented playlists in accordance with an example embodiment of the present invention. The diagram illustrates both a system and it components and the functions performed by each corresponding component. In some embodiments, the functions are performed sequentially. In other embodiments, the functions can be performed in parallel. The architecture includes fetching 1202 relevant data (e.g., metadata) from a database for all songs (t). Each consecutive song is paired (e.g., Pairs ($t_i$, $t_j$), where i and j are consecutive integers). In an example embodiment, fetching 1202 further includes receiving an object with all the metadata about the songs in the playlist. In another example embodiment, fetching 1202 further includes obtaining an object with all the metadata about the next N songs, where N is an integer.

The architecture further includes fetching segues 1204. In an example embodiment, a function in each of a plurality of segue objects obtains each song pair (with data) and returns an indicator (e.g., a flag True) if the segue object is determined to be a relevant segue. The architecture further includes instantiating matching segue objects 1206. The instantiated matching segue objects represent a space of possible segue objects to be used to augment the initially obtained playlist. The space of possible segue objects can be referred to as a story possibility space. In some embodiments, a database of segue templates stores the templates having fields that are populated with the metadata obtained for a corresponding song as discussed above in connection with FIGS. 7 and 8.

The architecture further includes generating, by the story generation engine 400, a story object 1208. Generating a story object 1208 includes building a graph to represent the story possibility space. In an example embodiment, the nodes are segues, and a path is a story, as described above, for example, in connection with FIGS. 5A-5F. Generating a story object 1208 further includes finding sub-graphs in a larger graph that match grammars (human-specified segue type sequences). These matching segue types will be chosen to be in the final story.

Alternatively, another implementation could include reflecting grammars as weights in the original graph (for instance as very large weight numbers). If this approach is taken, then the step "find the best path" discussed above in connection with FIG. 5F would subsume the grammar matching explained in connection with FIG. 5E.

In an example embodiment, the grammars are reflected as preferences for story subsequences. Generating a story object 1208 further includes finding a path in the graph to tell the story. In some embodiments the grammars are supplied by a grammar database on which a bank of grammars have been prestored.

Generating augmented playlists can further include obtaining data from segues and song objects and performing natural language generation (NLG) on the segues to realize the segue texts into speech 1210. In some embodiments, the speech that is realized is then supplied to a voice platform that output the speech via a client device. As shown in FIG. 12, performing NLG can be accomplished by using a bank of NLG templates for segues that have been received from editors who supply new NLG templates for different segues 1212. In turn, each segue is inserted between the corresponding two Pairs ($t_i$, $t_j$) 1214.

Example System Implementation

FIG. 3 is a representative view of a system 100 in which some embodiments of the invention may be implemented. The media delivery system 104 operates to provide media content to one or more media playback devices 102, such as the media playback device 102, via the network 106.

In this document, the media content that is currently playing, queued to be played, or has been previously played can be represented as a first media content item. In addition, the media content that will be played after the first media content item is referred to as a second media content item. Further, the media content that will be played after the second media content item is referred to as a third media content item. The first media content item, the second media content item, and the third media content item can be of various types. In some embodiments, the first media content item and/or the second media content item can be media content items 230A, 230B, . . . 230N (collectively and/or individually sometimes referred to simply as media content item 230) or media content item 234 (FIG. 3). Alternatively, the first media content item, the second media content item and/or the third media content item can be playlists 239 (FIG. 3). In still other embodiments, the first media content item, the second media content item and/or the third media content item can be of other types of media contexts 238. In addition, either the first media content item, the second media content item, or the third media content can be a segue.

In some embodiments, a query (e.g., query 120 of FIG. 1) can be provided via a manual input 154. In other embodiments a query can be provided via a voice input 156. A voice input 156, can be a voice request received through a sound detection device (e.g., a microphone). As described herein, the voice request can be processed into a text query suitable for media content search. In other embodiments, the query can be a text that is typed using the media playback device 102 or another computing device.

Still referring to FIG. 3, in this example, the media playback device 102 includes a user input device 130, a display device 132, a data communication device 134, a media content output device 140, a processing device 148, and a memory device 150.

The media playback device 102 operates to play media content. For example, the media playback device 102 is configured to play media content that is provided (e.g., streamed or transmitted) by a system external to the media playback device 102, such as the media delivery system 104, another system, or a peer device. In other examples, the media playback device 102 operates to play media content stored locally on the media playback device 102. In yet other examples, the media playback device 102 operates to play media content that is stored locally as well as media content provided by other systems.

In some embodiments, the media playback device 102 is a handheld or portable entertainment device, smart speaker, smartphone, tablet, watch, wearable device, or any other type of computing device capable of playing media content. In other embodiments, the media playback device 102 is a laptop computer, desktop computer, television, gaming console, set-top box, network appliance, blue-ray or DVD player, media player, stereo, or radio, some examples of which are depicted in FIG. 2.

The user input device 130 operates to receive a user input 152 from a user (e.g., query 120 and user U of FIG. 1) for controlling the media playback device 102. As illustrated, the user input 152 can include a manual input 154 and a voice input 156. In some embodiments, the user input device 130 includes a manual input device 160. In some embodiments the user input device 130 includes a sound detection device 162.

The manual input device 160 operates to receive the manual input 154 for controlling playback of media content via the media playback device 102. In some embodiments, the manual input device 160 includes one or more buttons, keys, touch levers, switches, and/or other mechanical input devices for receiving the manual input 154. For example, the manual input device 160 includes a text entry interface, such as a mechanical keyboard, a virtual keyboard, or a handwriting input device, which is configured to receive a text input, such as a text version of the user query 120. In addition, in some embodiments, the manual input 154 is received for managing various pieces of information transmitted via the media playback device 102 and/or controlling other functions or aspects associated with the media playback device 102.

The sound detection device 162 operates to detect and record sounds from proximate the media playback device 102. For example, the sound detection device 162 can detect sounds including the voice input 156. In some embodiments, the sound detection device 162 includes one or more acoustic sensors configured to detect sounds proximate the media playback device 102. For example, acoustic sensors of the sound detection device 162 include one or more microphones. Various types of microphones can be used for the sound detection device 162 of the media playback device 102.

In some embodiments, the voice input 156 is a voice of a user (also referred to herein as an utterance) for controlling playback of media content via the media playback device 102. For example, the voice input 156 includes a voice version of a user query received from the sound detection device 162 of the media playback device 102. In addition, the voice input 156 is a voice of a user for managing various data transmitted via the media playback device 102 and/or controlling other functions or aspects associated with the media playback device 102.

In some embodiments, the sounds detected by the sound detection device 162 can be processed by the sound processing engine 180 of the media playback device 102 as described below.

Referring still to FIG. 3, the display device 132 operates to display information to a user. Examples of such information include media content playback information, notifications, and other information. In some embodiments, the display device 132 is configured as a touch sensitive display and includes the manual input device 160 of the user input device 130 for receiving the manual input 154 from a selector (e.g., a finger, stylus etc.) controlled by the user (e.g., user U of FIG. 1). In some embodiments, therefore, the display device 132 operates as both a display device and a user input device. The touch sensitive display device 132 operates to detect inputs based on one or both of touches and near-touches. In some embodiments, the display device 132 displays a graphical user interface for interacting with the media playback device 102. Other embodiments of the display device 132 do not include a touch sensitive display screen. Some embodiments include a display device and one or more separate user interface devices. Further, some embodiments do not include a display device.

The data communication device 134 operates to enable the media playback device 102 to communicate with one or more computing devices over one or more networks, such as the network 106. For example, the data communication device 134 is configured to communicate with the media delivery system 104 and receive media content from the media delivery system 104 at least partially via the network 106. The data communication device 134 can be a network interface of various types which connects the media playback device 102 to the network 106.

The network 106 typically includes a set of computing devices and communication links between the computing devices. The computing devices in the network 106 use the links to enable communication among the computing devices in the network. The network 106 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 106 includes various types of communication links. For example, the network 106 can include wired and/or wireless links, including cellular, Bluetooth®, Wi-Fi®, ultra-wideband (UWB), 802.11, ZigBee, near field communication (NFC), an ultrasonic data transmission, and other types of wireless links. Furthermore, in various embodiments, the network 106 is implemented at various scales. For example, the network 106 can be implemented as one or more vehicle area networks, local area networks (LANs), metropolitan area networks, subnets, wide area networks (WAN) (such as the Internet), or can be implemented at another scale. Further, in some embodiments, the network 106 includes multiple networks, which may be of the same type or of multiple different types.

Examples of the data communication device 134 include wired network interfaces and wireless network interfaces. Wireless network interfaces include infrared, BLUETOOTH® wireless technology, 802.11a/b/g/n/ac, and cellular or other radio frequency interfaces in at least some possible embodiments. Examples of cellular network technologies include LTE, WiMAX, UMTS, CDMA2000, GSM, cellular digital packet data (CDPD), and Mobitex.

The media content output device 140 operates to output media content. In some embodiments, the media content output device 140 generates the media output for the user. In some embodiments, the media content output device 140 includes one or more embedded speakers 164 which are incorporated in the media playback device 102.

Alternatively or in addition, some embodiments of the media playback device 102 include an external speaker interface 166 as an alternative output of media content. The external speaker interface 166 is configured to connect the media playback device 102 to another system having one or more speakers, such as headphones, a portal speaker, and a vehicle entertainment system, so that the media output 122 is generated via the speakers of the other system external to the media playback device 102. Examples of the external speaker interface 166 include an audio output jack, a USB port, a Bluetooth transmitter, a display panel, and a video output jack. Other embodiments are possible as well. For example, the external speaker interface 166 is configured to transmit a signal that can be used to reproduce an audio signal by a connected or paired device such as headphones or a speaker.

The processing device 148, in some embodiments, comprises one or more central processing units (CPU). In other embodiments, the processing device 148 additionally or alternatively includes one or more digital signal processors, field-programmable gate arrays, or other electronic circuits.

The memory device 150 typically includes at least some form of computer-readable media. The memory device 150 can include at least one data storage device. Computer readable media includes any available media that can be accessed by the media playback device 102. By way of example, computer-readable media is non-transitory and includes computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the media playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The memory device 150 operates to store data and instructions. In some embodiments, the memory device 150 stores instructions for a media content cache 172, a caching management engine 174, a media playback engine 176, a sound processing engine 180, and a voice interaction engine 182.

Some embodiments of the memory device 150 include the media content cache 172. The media content cache 172 stores media content items, such as media content items that have been received from the media delivery system 104. The media content items stored in the media content cache 172 may be stored in an encrypted or unencrypted format. In some embodiments, the media content cache 172 also stores metadata about media content items such as title, artist name, album name, length, genre, mood, era, etc. The media content cache 172 can further store playback information about the media content items and/or other information associated with the media content items.

The caching management engine 174 is configured to receive and cache media content in the media content cache 172 and manage the media content stored in the media content cache 172. In some embodiments, when media content is streamed from the media delivery system 104, the caching management engine 174 operates to cache at least a portion of the media content into the media content cache 172. In other embodiments, the caching management engine 174 operates to cache at least a portion of media content into the media content cache 172 while online so that the cached media content is retrieved for playback while the media playback device 102 is offline.

The media playback engine 176 operates to play media content to a user. As described herein, the media playback engine 176 is configured to communicate with the media delivery system 104 to receive one or more media content items (e.g., through a media stream 232). In other embodiments, the media playback engine 176 is configured to play media content that is locally stored in the media playback device 102.

In some embodiments, the media playback engine 176 operates to retrieve one or more media content items that are either locally stored in the media playback device 102 or remotely stored in the media delivery system 104. In some embodiments, the media playback engine 176 is configured to send a request to the media delivery system 104 for media content items and receive information about such media content items for playback.

The sound processing engine 180 is configured to receive sound signals obtained from the sound detection device 162 and process the sound signals to identify different sources of the sounds received via the sound detection device 162. In some embodiments, the sound processing engine 180 operates to filter the voice input 156 (e.g., a voice request of the user query 120) from noises included in the detected sounds. Various noise cancellation technologies, such as active noise control or cancelling technologies or passive noise control or cancelling technologies, can be used to filter the voice input from ambient noise. In examples, the sound processing engine 180 filters out omni-directional noise and preserves directional noise (e.g., an audio input difference between two microphones) in audio input. In examples, the sound processing engine 180 removes frequencies above or below human speaking voice frequencies. In examples, the sound processing engine 180 subtracts audio output of the device from the audio input to filter out the audio content being provided by the device (e.g., to reduce the need of the user to shout over playing music). In examples, the sound processing engine 180 performs echo cancellation. By using one or more of these techniques, the sound processing engine 180 provides sound processing customized for use in a vehicle environment.

In other embodiments, the sound processing engine 180 operates to process the received sound signals to identify the sources of particular sounds of the sound signals, such as people's conversation in the vehicle, the vehicle engine sound, or other ambient sounds associated with the vehicle.

In some embodiments, the sound processing engine 180 at least partially operates to analyze a recording of sounds captured using the sound detection device 162, using speech recognition technology to identify words spoken by the user. In addition or alternatively, other computing devices, such as the media delivery system 104 (e.g., a voice interaction server 204 thereof) can cooperate with the media playback device 102 for such analysis. The words may be recognized as commands from the user that alter the playback of media content and/or other functions or aspects of the media playback device 102. In some embodiments, the words and/or the recordings may also be analyzed using natural language processing and/or intent recognition technology to determine appropriate actions to take based on the spoken words. Additionally or alternatively, the sound processing engine 180 may determine various sound properties about the sounds proximate the media playback device 102 such as volume, dominant frequency or frequencies, etc. These sound properties may be used to make inferences about the environment proximate to the media playback device 102.

The voice interaction engine 182 operates to cooperate with the media delivery system 104 (e.g., a voice interaction server 204 thereof) to identify a command (e.g., a user intent) that is conveyed by the voice input 156. In some embodiments, the voice interaction engine 182 transmits the voice input 156 (e.g., of a user) that is detected by the sound processing engine 180 to the media delivery system 104 so that the media delivery system 104 operates to determine a command intended by the voice input 156. In other embodiments, at least some of the determination process of the command can be performed locally by the voice interaction engine 182.

In addition, some embodiments of the voice interaction engine 182 can operate to cooperate with the media delivery system 104 (e.g., the voice interaction server 204 thereof) to provide a voice assistant that performs various voice-based interactions with the user, such as voice feedbacks, voice notifications, voice recommendations, and other voice-related interactions and services.

Referring still to FIG. 3, the media delivery system 104 includes a media content server 200, a media content search server 202, a voice interaction server 204, a user command interpretation server 206, and a story generation server 208.

The media delivery system 104 comprises one or more computing devices and provides media content to the media playback device 102 and, in some embodiments, other media playback devices as well. In addition, the media delivery system 104 interacts with the media playback device 102 to provide the media playback device 102 with various functionalities.

In at least some embodiments, the media content server 200, the media content search server 202, the voice interaction server 204, the user command interpretation server 206, and the story generation server 208 are provided by separate computing devices. In other embodiments, the media content server 200, the media content search server 202, the voice interaction server 204, the user command interpretation server 206, and the story generation server 208 are provided by the same computing device(s). Further, in some embodiments, at least one of the media content server 200, the media content search server 202, the voice interaction server 204, the user command interpretation server 206, and the story generation server 208 is provided by multiple computing devices. For example, the media content server 200, the media content search server 202, the voice interaction server 204, the user command interpretation server 206, and the story generation server 208 may be provided by multiple redundant servers located in multiple geographic locations.

Although FIG. 3, for example shows a single media content server 200, a single media content search server 202, a single voice interaction server 204, a single user command interpretation server 206, and the story generation server 208 some embodiments include multiple media content servers, media content search servers, voice interaction servers, user command interpretation servers, and story generation servers. In these embodiments, each of the multiple media content servers, media content search servers, voice interaction servers, user command interpretation servers, and story generation servers may be identical or similar to the media content server 200, the media content search server 202, the voice interaction server 204, the user command interpretation server 206, and the story generation server 208 respectively, as described herein, and may provide similar functionality with, for example, greater capacity and redundancy and/or services from multiple geographic locations. Alternatively, in these embodiments, some of the multiple media content servers, the media content search servers, the voice interaction servers, the user command interpretation servers and/or story generation servers may perform specialized functions to provide specialized services. Various combinations thereof are possible as well.

The media content server 200 transmits stream media to media playback devices such as the media playback device 102. In some embodiments, the media content server 200 includes a media server application 212, a processing device 214, a memory device 216, and a data communication device 218. The processing device 214 and the memory device 216 may be similar to the processing device 148 and the memory device 150, respectively, which have each been previously described. Therefore, the description of the processing device 214 and the memory device 216 are omitted for brevity purposes.

The data communication device 218 operates to communicate with other computing devices over one or more networks, such as the network 106. Examples of the data communication device include one or more wired network interfaces and wireless network interfaces. Examples of such wireless network interfaces of the data communication device 218 include wireless wide area network (WWAN) interfaces (including cellular networks) and wireless local area network (WLANs) interfaces. In other examples, other types of wireless interfaces can be used for the data communication device 218.

In some embodiments, the media server application 212 is configured to stream media content, such as music or other audio, video, or other suitable forms of media content. The media server application 212 includes a media stream service 222, a media application interface 224, and a media data store 226. The media stream service 222 operates to buffer media content, such as media content items 230A, 230B, and 230N (collectively 230), for streaming to one or more media streams 232A, 232B, and 232N (collectively 232).

The media application interface 224 can receive requests or other communication from media playback devices or other systems, such as the media playback device 102, to retrieve media content items from the media content server 200. For example, in FIG. 3, the media application interface 224 receives communication from the media playback device 102 to receive media content from the media content server 200.

In some embodiments, the media data store 226 stores media content items 234, media content metadata 236, media contexts 238, user accounts 240, and taste profiles 242. The media data store 226 may comprise one or more databases and file systems. Other embodiments are possible as well.

As described herein, the media content items 234 (including the media content items 230) may be audio, video, or any other type of media content, which may be stored in any format for storing media content.

The media content metadata 236 provides various information (also referred to herein as attribute(s)) associated with the media content items 234. In addition or alternatively, the media content metadata 236 provides various information associated with the media contexts 238. In some embodiments, the media content metadata 236 includes one or more of title, artist name, album name, length, genre, mood, era, etc.

In some embodiments, the media content metadata 236 includes acoustic metadata, cultural metadata, and explicit metadata. The acoustic metadata may be derived from analysis of the track and refers to a numerical or mathematical representation of the sound of a track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Acoustic metadata may take the form of one or more vectors, matrices, lists, tables, and other data structures. Acoustic metadata may be derived from analysis of the music signal. One form of acoustic metadata, commonly termed an acoustic fingerprint, may uniquely identify a specific track. Other forms of acoustic metadata may be formed by compressing the content of a track while retaining some or all of its musical characteristics.

The cultural metadata refers to text-based information describing listeners' reactions to a track or song, such as styles, genres, moods, themes, similar artists and/or songs, rankings, etc. Cultural metadata may be derived from expert opinion such as music reviews or classification of music into genres. Cultural metadata may be derived from listeners through websites, chatrooms, blogs, surveys, and the like. Cultural metadata may include sales data, shared collections, lists of favorite songs, and any text information that may be used to describe, rank, or interpret music. Cultural metadata may also be generated by a community of listeners and automatically retrieved from Internet sites, chat rooms, blogs, and the like. Cultural metadata may take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist.

The explicit metadata refers to factual or explicit information relating to music. Explicit metadata may include album and song titles, artist and composer names, other credits, album cover art, publisher name and product number, and other information. Explicit metadata is generally not derived from the music itself or from the reactions or opinions of listeners.

At least some of the metadata 236, such as explicit metadata (names, credits, product numbers, etc.) and cultural metadata (styles, genres, moods, themes, similar artists and/or songs, rankings, etc.), for a large library of songs or tracks can be evaluated and provided by one or more third party service providers. Acoustic and cultural metadata may take the form of parameters, lists, matrices, vectors, and other data structures. Acoustic and cultural metadata may be stored as XML files, for example, or any other appropriate file type. Explicit metadata may include numerical, text, pictorial, and other information. Explicit metadata may also be stored in an XML or other file. All or portions of the metadata may be stored in separate files associated with specific tracks. All or portions of the metadata, such as acoustic fingerprints and/or description vectors, may be stored in a searchable data structure, such as a k-D tree or other database format.

Referring still to FIG. 3, each of the media contexts 238 is used to identify one or more media content items 234. In some embodiments, the media contexts 238 are used to determine or further specify how (or whether) to augment the playlist and create a story playlist at a given music playback session. In some embodiments, the media contexts 238 are configured to group one or more media content items 234 and provide a particular context to the group of media content items 234. Some examples of the media contexts 238 include albums, artists, playlists, and individual media content items. By way of example, where a media context 238 is an album, the media context 238 can represent that the media content items 234 identified by the media context 238 are associated with that album.

As described above, the media contexts 238 can include playlists 239. The playlists 239 are used to identify one or more of the media content items 234. In some embodiments, the playlists 239 identify a group of the media content items 234 in a particular order. In other embodiments, the playlists 239 merely identify a group of the media content items 234 without specifying a particular order. Some, but not necessarily all, of the media content items 234 included in a particular one of the playlists 239 are associated with a common characteristic such as a common genre, mood, or era.

In some embodiments, a user can listen to media content items in a playlist 239 by selecting the playlist 239 via a media playback device, such as the media playback device 102. The media playback device then operates to communicate with the media delivery system 104 so that the media delivery system 104 retrieves the media content items identified by the playlist 239 and transmits data for the media content items to the media playback device for playback.

In some embodiments, the playlist 239 includes one or more playlist descriptions. The playlist descriptions include information associated with the playlist 239. The playlist descriptions can include a playlist title. In some embodiments, the playlist title can be provided by a user using the media playback device 102. In other embodiments, the playlist title can be provided by a media content provider (or a media-streaming service provider). In yet other embodiments, the playlist title can be automatically generated.

Other examples of playlist descriptions include a descriptive text. The descriptive text can be provided by the user and/or the media content provider, which is to represent the corresponding playlist 239. In other embodiments, the descriptive text of the playlist description can be obtained from one or more other sources. Such other sources can include expert opinion (e.g., music reviews or classification of music into genres), user opinion (e.g., reviews through websites, chatrooms, blogs, surveys, and the like), statistics (e.g., sales data), shared collections, lists of favorite playlists, and any text information that may be used to describe, rank, or interpret the playlist or music associated with the playlist. In some embodiments, the playlist descriptions can also be generated by a community of listeners and automatically retrieved from Internet sites, chat rooms, blogs, and the like.

In some embodiments, the playlist descriptions can take the form of one or more vectors, matrices, lists, tables, and other data structures. A form of cultural metadata particularly useful for comparing music is a description vector. A description vector is a multi-dimensional vector associated with a track, album, or artist. Each term of the description vector indicates the probability that a corresponding word or phrase would be used to describe the associated track, album or artist. Each term of the description vector indicates the probability that a corresponding word or phrase would be used to describe the associated track, album or artist.

In some embodiments, the playlist 239 includes a list of media content item identifications (IDs). The list of media content item identifications includes one or more media content item identifications that refer to respective media content items 234. Each media content item is identified by a media content item ID and includes various pieces of information, such as a media content item title, artist identification (e.g., individual artist name or group name, or multiple artist names or group names), and media content item data. In some embodiments, the media content item title and the artist ID are part of the media content metadata 236, which can further include other attributes of the media content item, such as album name, length, genre, mood, era, etc. as described herein.

At least some of the playlists 239 may include user-created playlists. For example, a user of a media streaming service provided using the media delivery system 104 can create a playlist 239 and edit the playlist 239 by adding, removing, and rearranging media content items in the playlist 239. A playlist 239 can be created and/or edited by a group of users together to make it a collaborative playlist. In some embodiments, user-created playlists can be available to a particular user only, a group of users, or to the public based on a user-definable privacy setting.

In some embodiments, when a playlist is created by a user or a group of users, the media delivery system 104 operates to generate a list of media content items recommended for the particular user or the particular group of users. In some embodiments, such recommended media content items can be selected based at least on the taste profiles 242 as described herein. Other information or factors can be used to determine the recommended media content items.

In addition or alternatively, at least some of the playlists 239 are created by a media streaming service provider. For example, such provider-created playlists can be automatically created by the media delivery system 104. In some embodiments, a provider-created playlist can be customized to a particular user or a particular group of users. By way of example, a playlist for a particular user can be automatically created by the media delivery system 104 based on the user's listening history (e.g., the user's taste profile) and/or listening history of other users with similar tastes. In other embodiments, a provider-created playlist can be configured to be available for the public in general. Provider-created playlists can also be sharable with other users.

The user accounts 240 are used to identify users of a media streaming service provided by the media delivery system 104. In some embodiments, a user account 240 allows a user to authenticate to the media delivery system 104 and enable the user to access resources (e.g., media content items, playlists, etc.) provided by the media delivery system 104. In some embodiments, the user can use different devices to log into the user account and access data associated with the user account in the media delivery system 104. User authentication information, such as a username, an email account information, a password, and other credentials, can be used for the user to log into his or her user account. It is noted that, where user data is to be protected, the user data is handled according to robust privacy and data protection policies and technologies. For instance, whenever personally identifiable information and any other information associated with users is collected and stored, such information is managed and secured using security measures appropriate for the sensitivity of the data. Further, users can be provided with appropriate notice and control over how any such information is collected, shared, and used.

The taste profiles 242 contain records indicating media content tastes of users. A taste profile can be associated with a user and used to maintain an in-depth understanding of the music activity and preference of that user, enabling personalized recommendations, taste profiling and a wide range of social music applications. Libraries and wrappers can be accessed to create taste profiles from a media library of the user, social website activity and other specialized databases to obtain music preferences.

In some embodiments, each taste profile 242 is a representation of musical activities, such as user preferences and historical information about the users' consumption of media content, and can include a wide range of information such as artist plays, song plays, skips, dates of listen by the user, songs per day, playlists, play counts, start/stop/skip data for portions of a song or album, contents of collections, user rankings, preferences, or other mentions received via a client device, or other media plays, such as websites visited, book titles, movies watched, playing activity during a movie or other presentations, ratings, or terms corresponding to the media, such as "comedy," etc.

In addition, the taste profiles 242 can include other information. For example, the taste profiles 242 can include libraries and/or playlists of media content items associated with the user. The taste profiles 242 can also include information about the user's relationships with other users (e.g., associations between users that are stored by the media delivery system 104 or on a separate social media site).

The taste profiles 242 can be used for a number of purposes. One use of taste profiles is for creating personalized playlists (e.g., personal playlisting). An API call associated with personal playlisting can be used to return a playlist customized to a particular user. For example, the media content items listed in the created playlist are constrained to the media content items in a taste profile associated with the particular user. Another example use case is for event recommendation. A taste profile can be created, for example, for a festival that contains all the artists in the festival. Music recommendations can be constrained to artists in the taste profile. Yet another use case is for personalized recommendation, where the contents of a taste profile are used to represent an individual's taste. This API call uses a taste profile as a seed for obtaining recommendations or playlists of similar artists. Yet another example of taste profile use case is referred to as bulk resolution. A bulk resolution API call is used to resolve taste profile items to pre-stored identifiers associated with a service, such as a service that provides metadata about items associated with the taste profile (e.g., song tempo for a large catalog of items). Yet another example use case for taste profiles is referred to as user-to-user recommendation. This API call is used to discover users with similar tastes by comparing the similarity of taste profile item(s) associated with users.

A taste profile 242 can represent a single user or multiple users. Conversely, a single user or entity can have multiple taste profiles 242. For example, one taste profile can be generated in connection with a user's media content play activity, whereas another separate taste profile can be generated for the same user based on the user's selection of media content items and/or artists for a playlist.

Referring still to FIG. 3, the media content search server 202 operates to perform media content search in response to a media content search request, such as the user query 120 (FIG. 1). In some embodiments, the media content search server 202 includes a media content search application, a processing device, a memory device, and a data communication device (not shown). The processing device, the memory device, and the data communication device for the media content search server 202 may be similar to the processing device 214, the memory device 216, and the data communication device 218, respectively, which have each been previously described.

In some embodiments, the media content search application operates to interact with the media playback device 102 and provide selection of one or more media content items based on the user query. The media content search application can interact with other servers, such as the media content server 200, the voice interaction server 204, the user command interpretation server 206, and the story generation server 208 to perform dynamic story generation.

Referring still to FIG. 3, the voice interaction server 204 operates to provide various voice-related functionalities to the media playback device 102. In some embodiments, the voice interaction server 204 includes a voice recognition application, a speech synthesis application, a processing device, a memory device, and a data communication device (not shown). The processing device, the memory device, and the data communication device of the voice interaction server 204 may be similar to the processing device 214, the memory device 216, and the data communication device 218, respectively, which have each been previously described.

In some embodiments, the voice recognition application and the speech synthesis application, either individually or in combination, operate to interact with the media playback device 102 and enable the media playback device 102 to perform various voice-related functions, such as voice media content search, voice feedback, voice notifications, etc.

In some embodiments, the voice recognition application is configured to perform speech-to-text (STT) conversion, such as receiving a recording of voice command (e.g., an utterance) and converting the utterance to a text format.

In some embodiments, the speech synthesis application is configured to perform text-to-speech (TTS) conversion, so that a language text is converted into speech. Then, the voice interaction server 204 can transmit an audio data or file for the speech to the media playback device 102 so that the media playback device 102 generates a voice assistance to the user using the transmitted audio data or file.

Referring still to FIG. 3, the user command interpretation server 206 operates to analyze the user command (e.g., the utterance) to determine appropriate actions to take according to the user command. In some embodiments, the user command interpretation server 206 analyzes a text version of a user command (e.g., a text version of the utterance). In other embodiments, a recording of the user command can be used for such analysis without converting into a text format.

In some embodiments, the user command interpretation server 206 includes a natural language understanding (NLU) application, a processing device, a memory device, and a data communication device (not shown). The processing device, the memory device, and the data communication device of the user command interpretation service may be similar to the processing device 214, the memory device 216, and the data communication device 218, respectively, which have each been previously described.

In some embodiments, the NLU application operates to analyze the text format of the utterance to determine functions to perform based on the utterance. The NLU application can use a natural language understanding algorithm that involves modeling human reading comprehension, such as parsing and translating an input according to natural language principles.

Referring still to FIG. 3, the story generation server 208 operates to perform story generation automatically according to the media content items 230 being streamed. In some embodiments, the story generation server 208 operates to perform story generation in response to a user request such as the user query 120 (FIG. 1). In some embodiments, the story generation server 208 includes story generation engine 400, a processing device 274, a memory device 276, and a data communication device 278. The processing device 274, the memory device 276, and the data communication device 278 for the story generation server 208 may be similar to the processing device 214, the memory device 216, and the data communication device 218, respectively, which have each been previously described.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-12 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method of augmenting a group of media content items, comprising:

forming a graph including a plurality of nodes and a plurality of edges, where each node represents a segue option at a position in the graph and each edge represents a connection between a first node in the graph at a first position and a second node in the graph at a second position, wherein each node of a first plurality of the nodes corresponds to a different contextualizing segue after a playback, by a playback device, of a first media content item in a playlist and before a playback, by the playback device, of a second media content item in the playlist, wherein each node of a second plurality of the nodes corresponds to a different contextualizing segue after a playback, by the playback device, of the second media content item in the playlist, the first media content item and the second media content item being different from each other; and selecting one of the first plurality of nodes and one of the second plurality of nodes to generate a path in the graph, the selecting being based on the playlist, wherein the path is configured to cause the playback device to output, consecutively, the first media content item, the contextualizing segue corresponding to the selected one of the first plurality of nodes, the second media content item, and the contextualizing segue corresponding to the selected one of the second plurality of nodes; and wherein the output of the contextualizing segue corresponding to the selected one of the first plurality of nodes includes a playback, by the playback device, of contextual information that describes information related to the first media content item and the second media content item.

2. A method according to claim 1, wherein the first node and the second node are neighboring nodes.

3. A method according to claim 1, further comprising:
assigning weights to the plurality of edges, and wherein to determine the path in the graph includes choosing a path in the graph having a maximum sum of edge weights.

4. A method according to claim 1, further comprising:
retrieving, from a grammar library, a plurality of grammars; and
finding one or more matches of the grammars in the graph,
wherein each grammar is a sequence of segue types.

5. The method according to claim 1, wherein the playlist includes an album.

6. A system for augmenting a group of media content items, comprising:
one or more processors and one or more storage devices storing instructions that are operable, when executed by the one or more processors, to cause the one or more processors to:
form a graph including a plurality of nodes and a plurality of edges, where each node represents a segue option at a position in the graph and each edge represents a connection between a first node in the graph at a first position and a second node in the graph at a second position, wherein each node of a first plurality of the nodes corresponds to a different contextualizing segue after a playback, by a playback device, of a first media content item in a playlist and before a playback, by the playback device, of a second media content item in the playlist, wherein each node of a second plurality of the nodes corresponds to a different contextualizing segue after a playback, by the playback device, of the second media content item in the playlist, the first media content item and the second media content item being different from each other; and
selecting one of the first plurality of nodes and one of the second plurality of nodes to generate a path in the graph, the selecting being based on the playlist,
wherein the path is configured to cause the playback device to output, consecutively, the first media content item, the contextualizing segue corresponding to the selected one of the first plurality of nodes, the second media content item, and the contextualizing segue corresponding to the selected one of the second plurality of nodes; and
wherein the output of the contextualizing segue corresponding to the selected one of the first plurality of nodes includes a playback, by the playback device, of contextual information that describes information related to the first media content item and the second media content item.

7. The method of claim 1, wherein the output of the contextualizing segue corresponding to the selected one of the first plurality of nodes is generated using natural language generation for the contextualizing segue.

8. The system of claim 6, wherein the first node and the second node are neighboring nodes.

9. The system of claim 6, the one or more storage devices storing instructions that are operable, when executed by the one or more processors, to cause the one or more processors to:
assign weights to the plurality of edges, and
generate the path in the graph by choosing a path in the graph having a maximum sum of edge weights.

10. The system of claim 6, the one or more storage devices storing instructions that are operable, when executed by the one or more processors, to cause the one or more processors to:
retrieve, from a grammar library, a plurality of grammars; and
find one or more matches of the grammars in the graph,
wherein each grammar is a sequence of segue types.

11. The system according to claim 6, wherein the playlist includes an album.

12. A non-transitory computer-readable medium having stored thereon one or more sequences of instructions for causing one or more processors to perform:
forming a graph including a plurality of nodes and a plurality of edges, where each node represents a segue option at a position in the graph and each edge represents a connection between a first node in the graph at a first position and a second node in the graph at a second position, wherein each node of a first plurality of the nodes corresponds to a different contextualizing segue after a playback, by a playback device, of a first media content item in a playlist and before a playback, by the playback device, of a second media content item in the playlist, wherein each node of a second plurality of the nodes corresponds to a different contextualizing segue after a playback, by the playback device, of the second media content item in the playlist, the first media content item and the second media content item being different from each other; and
selecting one of the first plurality of nodes and one of the second plurality of nodes to generate a path in the graph, the selecting being based on the playlist,
wherein the path is configured to cause the playback device to output, consecutively, the first media content item, the contextualizing segue corresponding to the selected one of the first plurality of nodes, the second media content item, and the contextualizing segue corresponding to the selected one of the second plurality of nodes; and
wherein the output of the contextualizing segue corresponding to the selected one of the first plurality of nodes includes a playback, by the playback device, of contextual information that describes information related to the first media content item and the second media content item.

13. The non-transitory computer-readable medium of claim 12, wherein the first node and the second node are neighboring nodes.

14. The system of claim 6, wherein the output of the contextualizing segue corresponding to the selected one of the first plurality of nodes is generated using natural language generation for the contextualizing segue.

15. The non-transitory computer-readable medium of claim 12, further having stored thereon a sequence of instructions for causing the one or more processors to perform:
 assigning weights to the plurality of edges, and wherein to determine the path in the graph includes choosing a path in the graph having a maximum sum of edge weights.

16. The non-transitory computer-readable medium of claim 12, further having stored thereon a sequence of instructions for causing the one or more processors to perform:
 retrieving, from a grammar library, a plurality of grammars; and
 finding one or more matches of the grammars in the graph,
 wherein each grammar is a sequence of segue types.

17. The non-transitory computer-readable medium of claim 12, wherein the playlist includes an album.

18. The non-transitory computer-readable medium of claim 12, wherein the output of the contextualizing segue corresponding to the selected one of the first plurality of nodes is generated using natural language generation for the contextualizing segue.

\* \* \* \* \*